US010710645B2

(12) United States Patent
Keller

(10) Patent No.: US 10,710,645 B2
(45) Date of Patent: Jul. 14, 2020

(54) VIBRATION DAMPENING SYSTEM FOR A WORK VEHICLE WITH CHASSIS DAMPERS

(71) Applicant: CNH Industrial America LLC, New Holland, PA (US)

(72) Inventor: Nathaniel J. Keller, Harwood, ND (US)

(73) Assignee: CNH Industrial America LLC, New Holland, PA (US)

( * ) Notice: Subject to any disclaimer, the term of this patent is extended or adjusted under 35 U.S.C. 154(b) by 131 days.

(21) Appl. No.: 16/118,789

(22) Filed: Aug. 31, 2018

(65) Prior Publication Data
US 2020/0070900 A1 Mar. 5, 2020

(51) Int. Cl.
*B62D 33/06* (2006.01)
*B62D 27/04* (2006.01)

(52) U.S. Cl.
CPC ......... *B62D 33/0604* (2013.01); *B62D 27/04* (2013.01)

(58) Field of Classification Search
CPC .................. B62D 33/0604; B60G 15/063; B60G 99/002; B60G 13/003; B60G 2300/02; B60G 15/062; B60G 2300/09; B60G 99/006
See application file for complete search history.

(56) References Cited

U.S. PATENT DOCUMENTS

| 3,560,019 A | 2/1971 | Moore |
| 3,940,177 A | 2/1976 | Miers et al. |
| 3,949,975 A | 4/1976 | Miers et al. |
| 4,135,757 A | 1/1979 | Smith et al. |
| 4,275,918 A | 6/1981 | Franco |
| 4,328,941 A | 5/1982 | Phillips et al. |
| 4,998,592 A | 3/1991 | Londt et al. |
| 5,520,259 A | 5/1996 | Onohara et al. |
| 5,652,704 A | 7/1997 | Catanzarite |
| 5,873,559 A | 2/1999 | von Flotow et al. |
| 5,899,288 A | 5/1999 | Schubert et al. |
| 7,029,059 B2 | 4/2006 | Bernhardt et al. |
| 7,150,336 B2 | 12/2006 | Desmarais |
| 7,648,193 B2 | 1/2010 | Fujiwara et al. |
| 7,665,708 B2 | 2/2010 | Stothers et al. |
| 7,896,358 B2 | 3/2011 | Hoff |
| 8,182,024 B2 | 5/2012 | Hayes et al. |
| 8,356,858 B2 | 1/2013 | Jang |
| 8,430,426 B2 | 4/2013 | Rasset et al. |
| 9,327,774 B2 | 5/2016 | Valerio et al. |

(Continued)

*Primary Examiner* — Pinel E Romain
(74) *Attorney, Agent, or Firm* — Rickard K. DeMille; Rebecca L. Henkel

(57) ABSTRACT

A vibration dampening system for a work vehicle may include a chassis frame extending lengthwise between a front end and a rear end. The chassis frame may include a first sidewall extending lengthwise along a first side of the frame between the front and rear ends and a second sidewall extending lengthwise along a second side of the frame between the front and rear ends. The system may also include a cab frame supported relative to the chassis frame via a suspension assembly, and a vibration damper coupled between the opposed first and second sides of the chassis frame. The vibration damper may extend lengthwise between a first end coupled to the first sidewall and a second end coupled to the second sidewall. The vibration damper is configured to reduce an amount of vibrations being transmitted through the chassis frame to the cab frame via the suspension assembly.

20 Claims, 17 Drawing Sheets

(56) References Cited

U.S. PATENT DOCUMENTS

2007/0017758 A1    1/2007   Or et al.
2008/0023261 A1    1/2008   Kaneko et al.
2014/0292014 A1   10/2014   Christianson

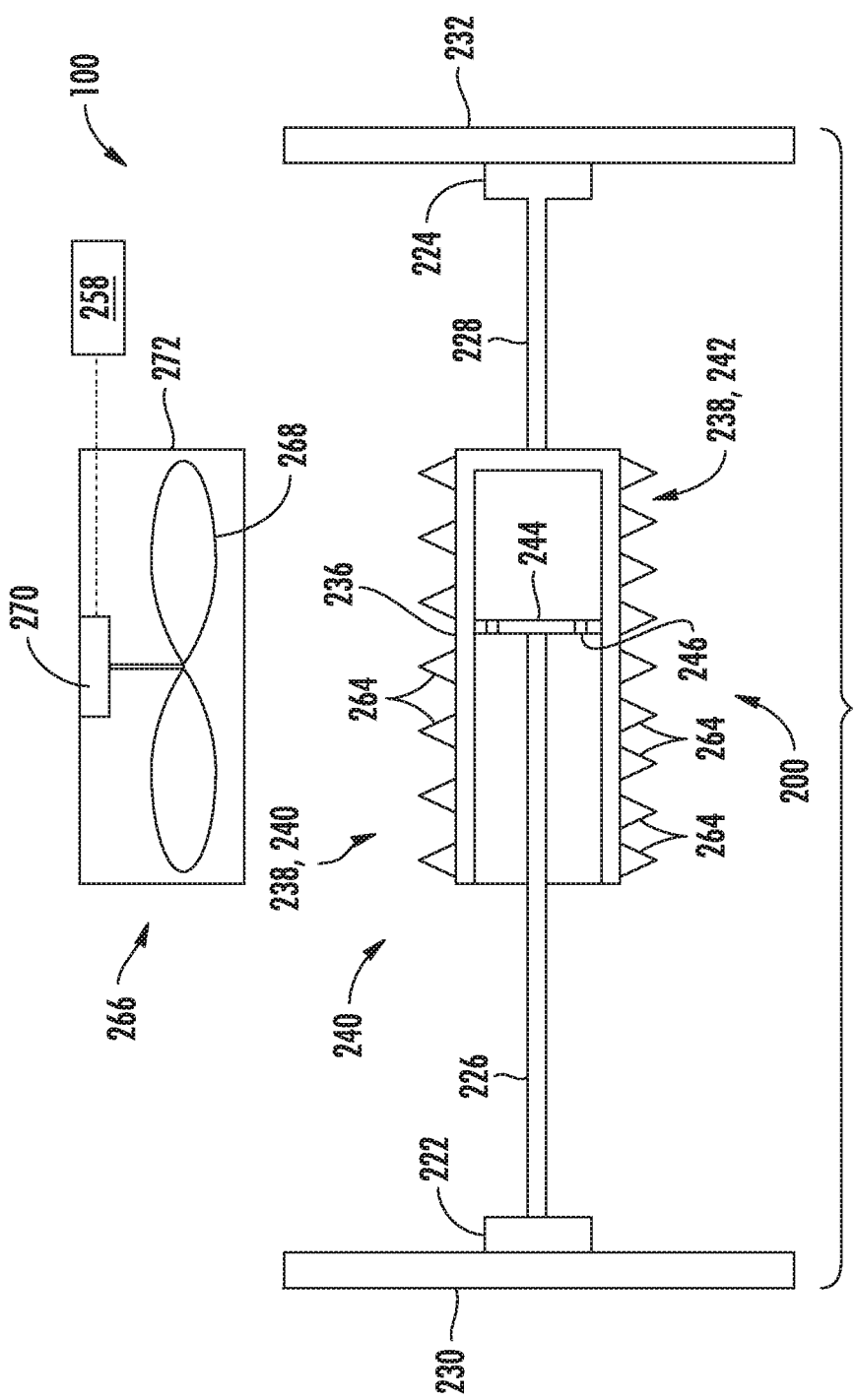

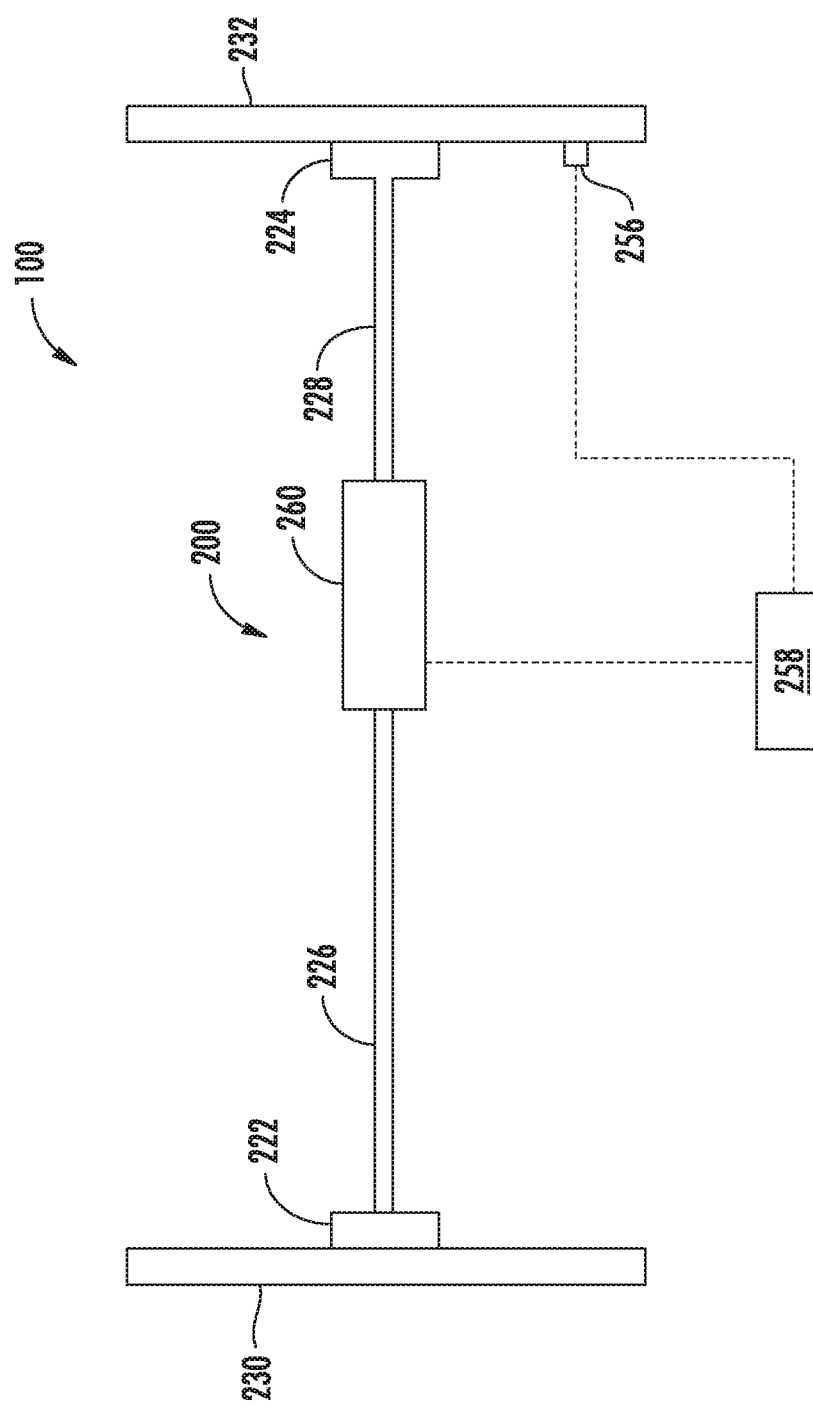

10,710,645 B2

VIBRATION DAMPENING SYSTEM FOR A WORK VEHICLE WITH CHASSIS DAMPERS

FIELD OF TECHNOLOGY

The present subject matter relates generally to work vehicles and, more particularly, to a system for reducing the amount of vibrational energy transmitted to a cab of a work vehicle to reduce the vibrations and related noise within the cab.

BACKGROUND

A wide range of off-highway, work vehicles have been developed for various purposes. In smaller work vehicles, seats and other operator supports may be sufficient, and these may be mounted on various forms of springs and other suspension components. However, in larger or more complex work vehicles, such as certain tractors and construction equipment, a partially or fully enclosed cab is more desirable, providing one or more operators with a comfortable location from which the vehicle may be operated. Such cabs, sometimes referred to as "operator environments" also provide a central location to which controls and operator interfaces may be fed, and from which most or all of the vehicle functions may be easily controlled.

Work vehicles typically include a number of components that create vibrations at various frequencies. Exemplary sources of vibration include engines, transmissions, tracks, axles, pumps, etc. Such vibrations are typically transferred from a chassis of the work vehicle, through its suspension system, and ultimately to the cab. In certain situations, the energy from the mechanical vibrations may be converted to airborne noise that can be heard by the operator. Further, these mechanical vibrations may cause discomfort in the operator's hands and/or feet.

Conventionally, suspension systems for mounting a cab relative to a vehicle's chassis include rubber isolators beneath the corners of the cab frame. While this type of mounting configuration can provide some reduction in vibration transmission from the chassis during vehicle operation, a significant amount of vibration energy is still transferred to the cab. Over a typical work period of several hours, the resulting noise and vibration can fatigue the operator and ultimately reduce his or her productivity.

Accordingly, an improved vibration dampening system that reduces the amount of vibrations transmitted to the operator's cab of a work vehicle would be welcomed in the technology.

BRIEF DESCRIPTION

Aspects and advantages will be set forth in part in the following description, or may be obvious from the description, or may be learned through practice of the invention.

In one aspect, the present subject matter is directed to a vibration dampening system for a work vehicle. The system may include a chassis frame extending lengthwise between a front end and a rear end and defining opposed first and second sides. The chassis frame may include a first sidewall extending lengthwise along the first side between the front and rear ends of the chassis frame and a second sidewall extending lengthwise along the second side between the front and rear ends of the chassis frame. The system may also include a cab frame supported relative to the chassis frame via a suspension assembly, and a vibration damper coupled between the opposed first and second sides of the chassis frame. The vibration damper may extend lengthwise between a first end coupled to the first sidewall and a second end coupled to the second sidewall. The vibration damper is configured to reduce an amount of vibrations being transmitted through the chassis frame to the cab frame via the suspension assembly.

In another aspect, the present subject matter is directed to a work vehicle including an operator's cab having a cab frame and a chassis having a chassis frame. The chassis frame may extend lengthwise between a front end and a rear end and may define opposed first and second sides. The chassis frame may also include a first sidewall extending lengthwise along the first side between the front and rear ends of the chassis frame and a second sidewall extending lengthwise along the second side between the front and rear ends of the chassis frame. The work vehicle may also include a suspension assembly configured to support the cab frame relative to the chassis frame, and a vibration damper coupled between the opposed first and second sides of the chassis frame. The vibration damper may extend lengthwise between a first end coupled to the first sidewall and a second end coupled to the second sidewall. The vibration damper is configured to reduce an amount of vibrations being transmitted through the chassis frame to the cab frame via the suspension assembly.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 18 illustrates a schematic view of another embodiment of a damper configuration suitable for use within the disclosed vibration dampening system in accordance with aspects of the present subject matter; and FIG. 19 illustrates a schematic view of a further embodiment of a damper configuration suitable for use within the disclosed vibration dampening system in accordance with aspects of the present subject matter.

Figure 1:
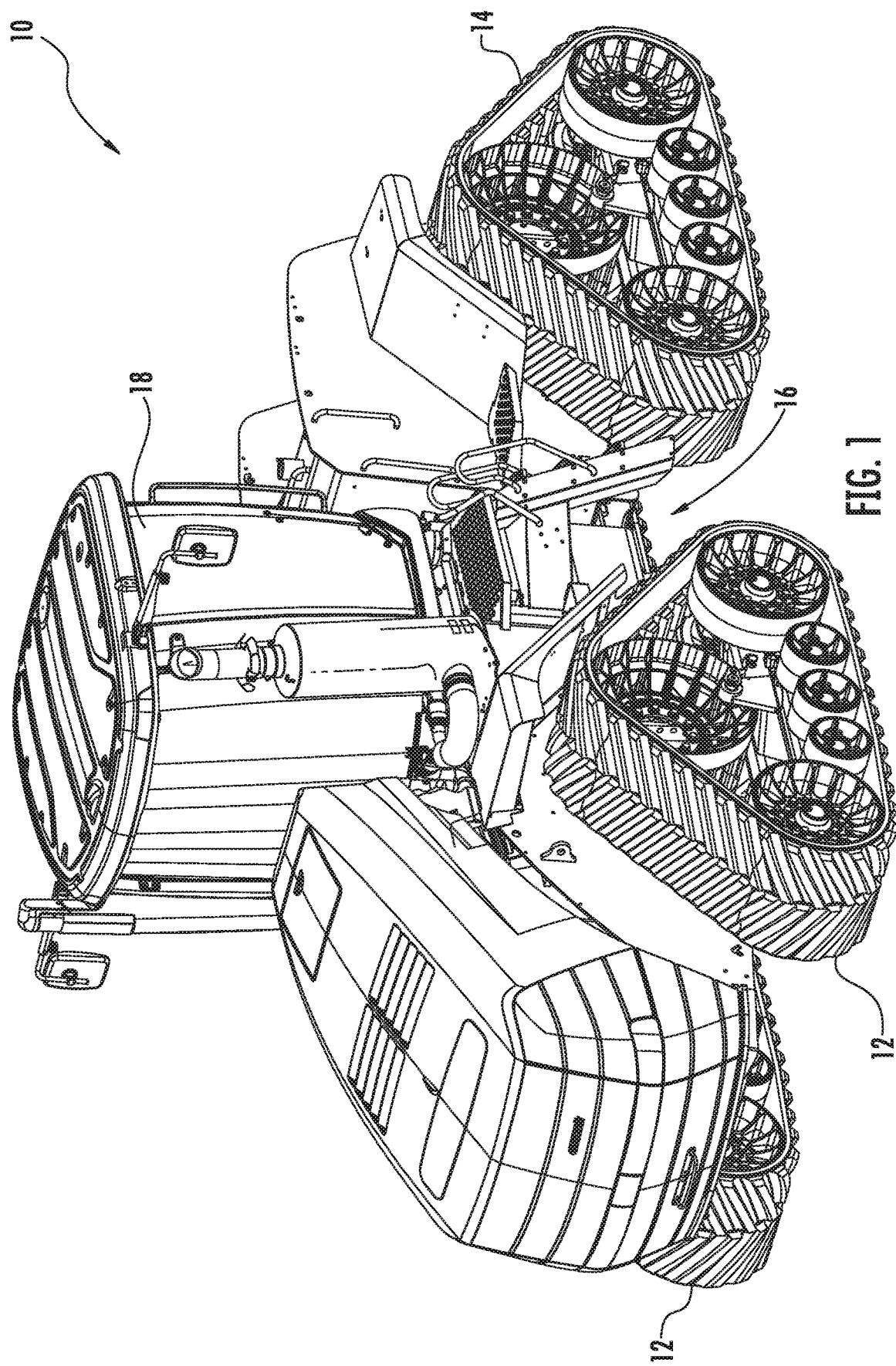
FIG. 1 illustrates a perspective view of one embodiment of a work vehicle in accordance with aspects of the present subject matter.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a vibration dampening system for a work vehicle, such as an agricultural vehicle, construction vehicle, and/or any other suitable off-road vehicle. As will be described in detail below, the vibration dampening system may, in several embodiments, include a chassis frame, a cab frame, and a suspension assembly coupled between the chassis frame and the cab frame. In addition, the system may include one or more dampening components or dampers provided in operative association with the chassis frame, the cab frame, and/or the suspension assembly. The dampers may generally be configured to dampen or otherwise reduce the vibrations being transmitted through the component(s) with which it is associated, thereby reducing the overall amount of vibrations ultimately transmitted to the cab during operation of the work vehicle. As a result, the amount of vibrations felt by the operator and the amount of noise generated within the cab may be significantly reduced, thereby increasing operator comfort and reducing operator fatigue.

In one embodiment, the vibration damper(s) of the disclosed system may be provided in operative association with the chassis frame. For example, one or more dampers may be installed between structural members extending along opposed sides of the chassis frame to reduce the amount of vibration transmitted therebetween. In such an embodiment, as the sides of the chassis frame vibrate relative to one another, at least a portion of the vibrational energy will pass through the damper(s) and get converted into heat or may otherwise be absorbed by the damper(s), thereby reducing the amount of vibration that is transmitted to the cab of the work vehicle.

In another embodiment, the vibration damper(s) of the disclosed system may be provided in operative association with the cab frame. For example, one or more dampers may be installed between structural members extending along opposed sides of the cab frame to reduce the amount of vibration transmitted therebetween. In such an embodiment, as the sides of the cab frame vibrate relative to one another, at least a portion of the vibrational energy will pass through the damper(s) and get converted into heat or may otherwise be absorbed by the damper(s), thereby reducing the amount of vibration within the cab.

In a further embodiment, the vibration damper(s) of the disclosed system may be provided in operative association with one or more components of the suspension assembly. For example, one or more dampers may be installed relative to a support structure(s) of the suspension assembly to reduce the amount of vibration transmitted therethrough. For instance, in one embodiment, the support structure(s) may correspond to a suspension link(s) configured to provide a load path between the vehicle chassis and the suspension assembly. In such an embodiment, by reducing the vibrations transmitted through the link(s), the amount of vibrations transmitted to the cab may ultimately be reduced.

Referring now to the drawings, FIG. 1 illustrates a perspective view of one embodiment of a work vehicle 10 in accordance with aspects of the present subject matter. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front tracks 12, a pair or rear tracks 14, and a chassis 16 coupled to and supported by the tracks 12, 14. As is generally understood, the work vehicle 10 may also include an engine and a transmission (not shown) supported by the chassis 16, which may be used to rotationally drive the front tracks 12 and/or the rear tracks 14. Additionally, an operator's cab 18 may be supported by a portion of the chassis 16 and may house various control devices (not shown) for permitting an operator to control the operation of the work vehicle 10. As will be described below, the cab 18 may be mounted on the chassis 16 via a suspension assembly 20.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include tires in lieu of tracks 12, 14 or may include a combination of tires and tracks.

Figure 2:
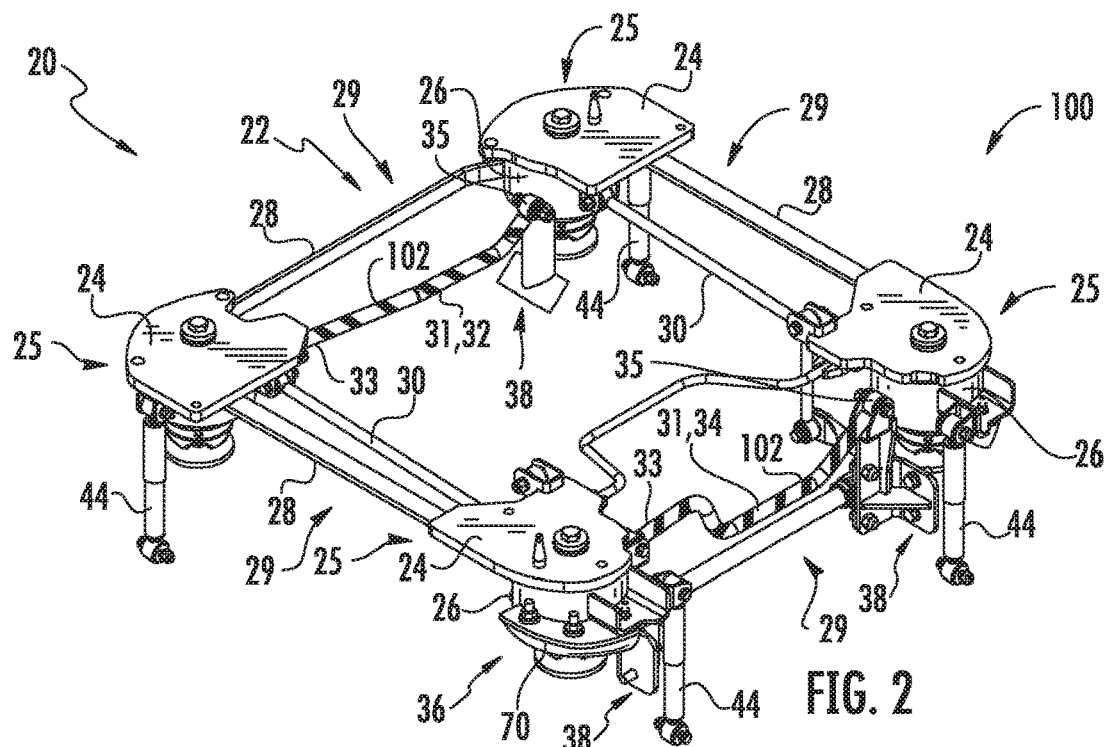
FIG. 2 illustrates a top perspective view of one embodiment of a cab suspension assembly in accordance with aspects of the present subject matter, particularly illustrating the suspension assembly including one or more features and/or components of a system for reducing the amount of vibrations transmitted through the assembly to the vehicle's cab.
Figure 3:
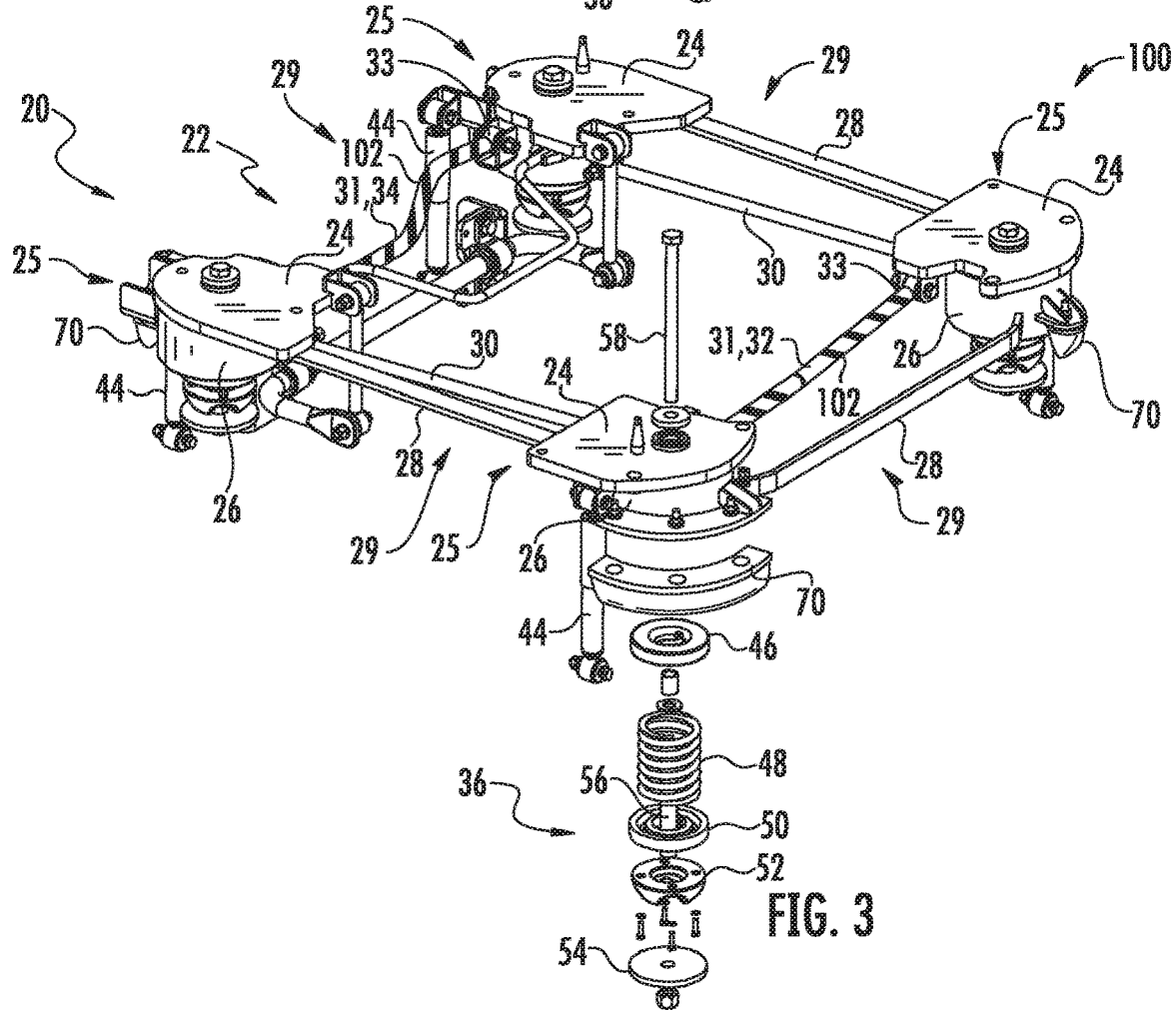
FIG. 3 illustrates another top perspective view of the cab suspension assembly shown in FIG. 2, particularly illustrating a mounting assembly of the system exploded out for purposes of illustration.
Figure 4:
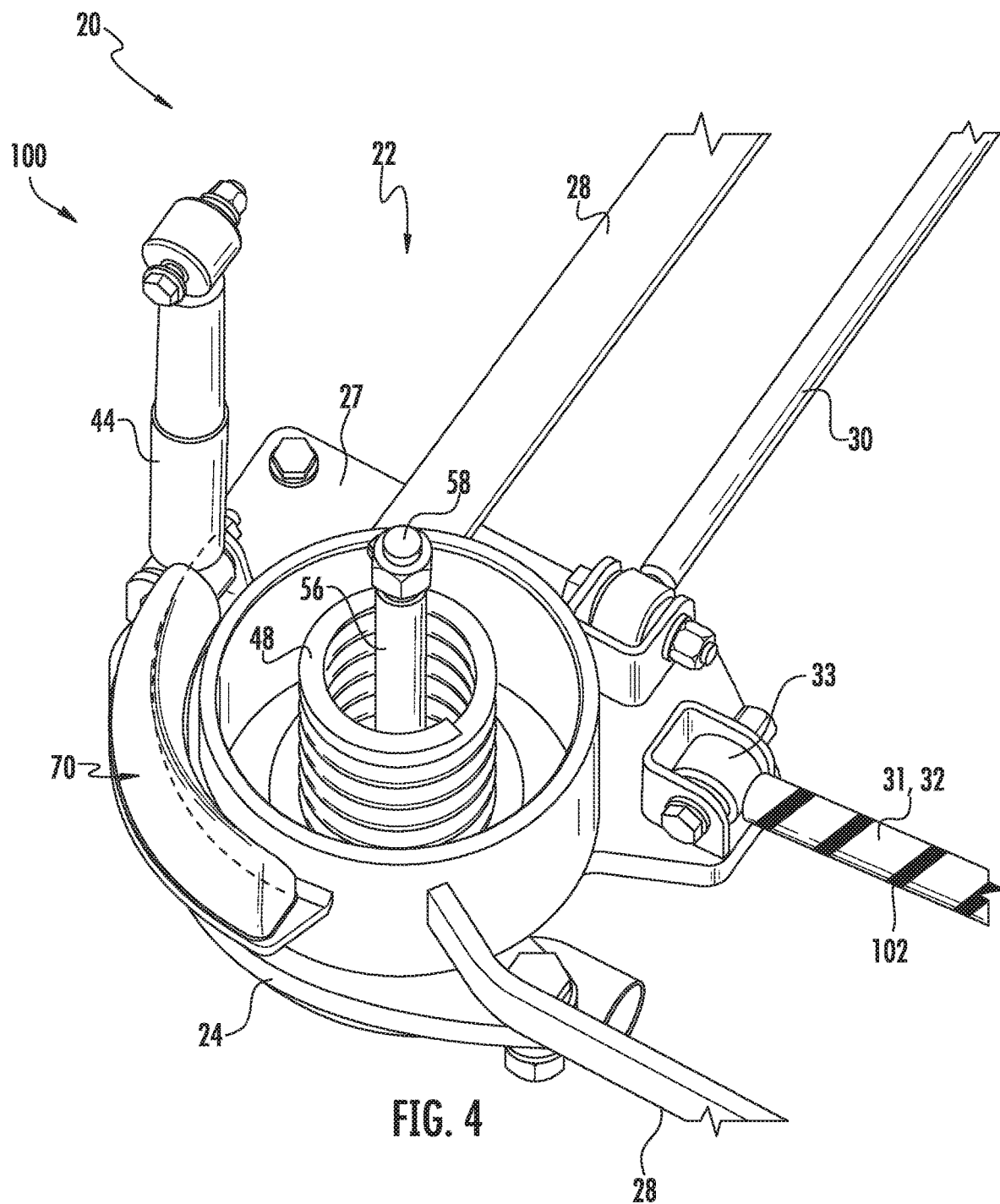
FIG. 4 illustrates a bottom perspective view of one of the corners of the cab suspension assembly shown in FIGS. 2 and 3.
Figure 5:
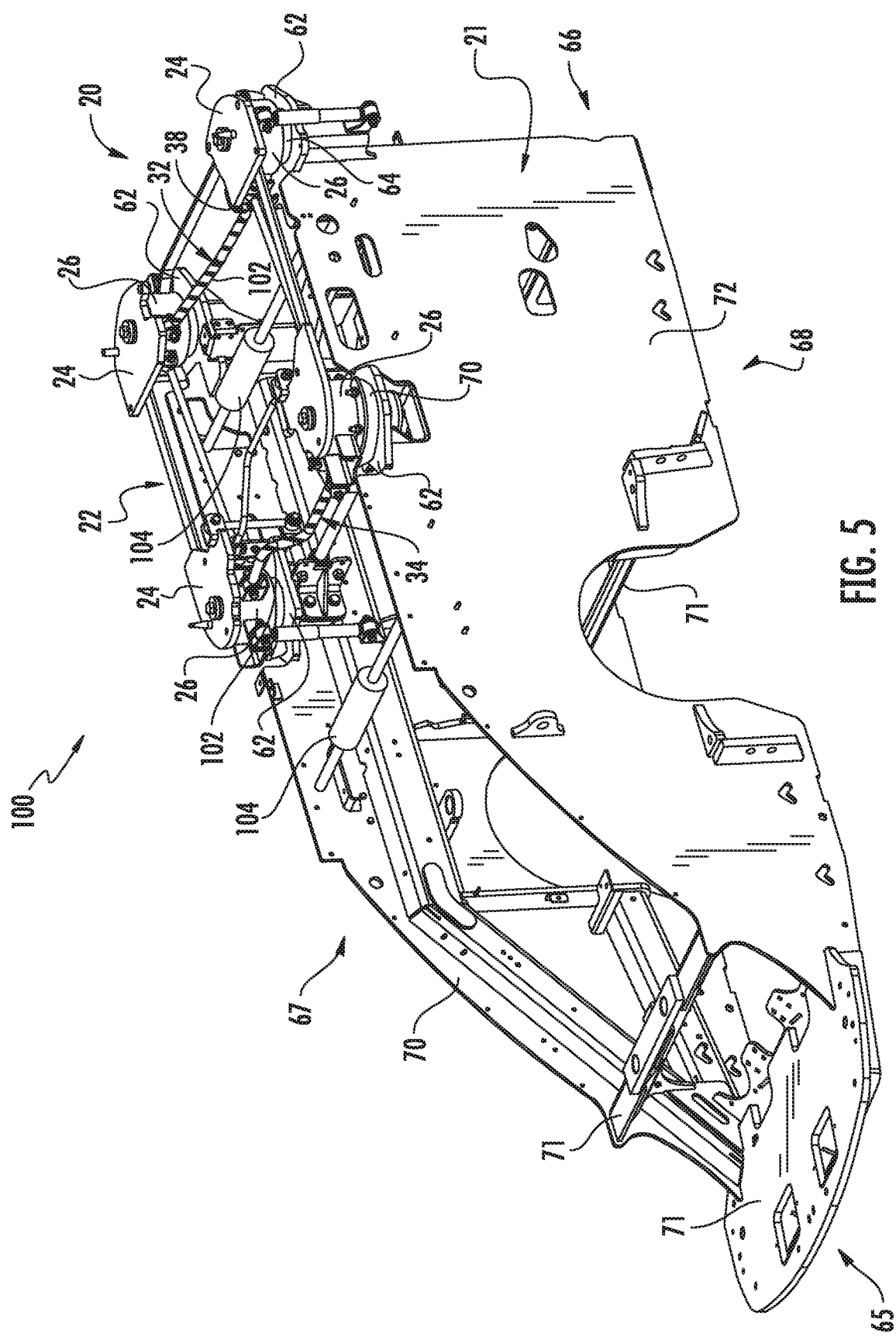
FIG. 5 illustrates a perspective view of the cab suspension assembly shown in FIGS. 2 and 3 mounted onto one embodiment of a chassis frame, particularly illustrating the chassis frame including one or more features and/or components of a system for reducing the amount of vibrations transmitted through the frame to the suspension assembly.
Figure 6:
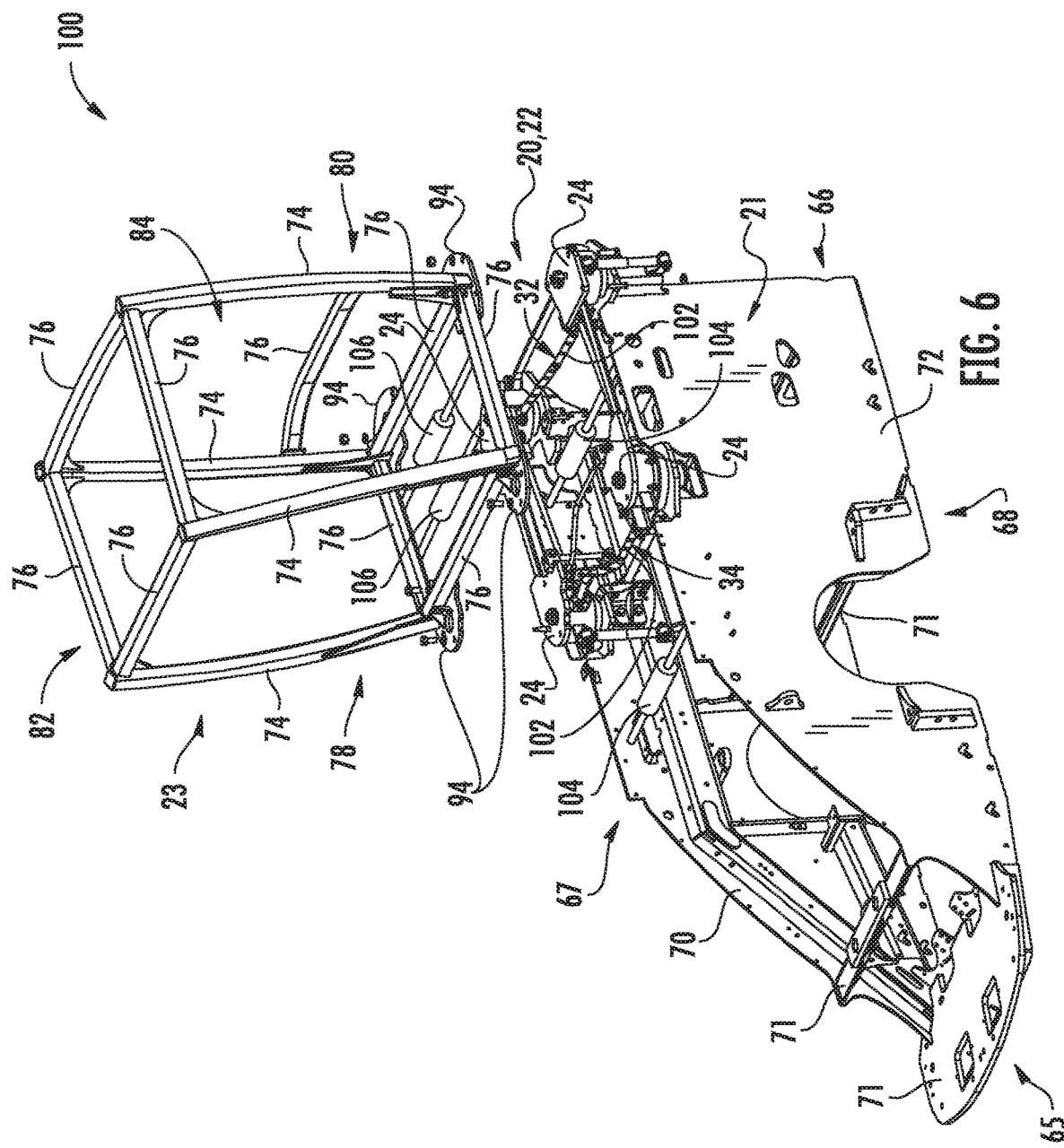
FIG. 6 illustrates a perspective view of one embodiment of a cab frame exploded away from the chassis and associated suspension assembly shown in FIG. 5, particularly illustrating one or more features and/or components of a system for reducing the amount of vibrations transmitted through the various components shown in FIG. 6 in accordance with aspects of the present subject matter.

Referring now to FIGS. 2-6, various views of one embodiment of a cab suspension assembly 20 suitable for mounting an operator's cab to a chassis of a work vehicle (e.g., the work vehicle 10 shown in FIG. 1) are illustrated in accordance with aspects of the present subject matter. Specifically, FIG. 2 illustrates a top perspective view of one embodiment of the cab suspension assembly 20. FIG. 3 illustrates another top perspective view of the suspension assembly 20 shown in FIG. 2 rotated 180 degrees, particularly illustrating various components of the suspension assembly 20 being exploded out at one of the corners of the suspension assembly 20. FIG. 4 illustrates a bottom perspective view of one of the corners of the suspension assembly 20 shown in FIGS. 2 and 3. FIG. 5 illustrates a perspective view of the suspension assembly 20 shown in FIGS. 2-4 coupled to one embodiment of a chassis frame 21 of the chassis 16 of the work vehicle 10 shown in FIG. 1. Additionally, FIG. 6 illustrates a perspective view of one embodiment of a cab frame 23 of the cab 18 of the work vehicle 10 shown in FIG. 1 exploded away from the chassis frame 21 and suspension assembly 20 shown in FIG. 5. Moreover, as will be described below, FIGS. 2-6 also illustrate various components and/or features of one or more embodiments of a vibration dampening system 100 for reducing the amount of vibrational energy transmitted from the chassis frame 21 through the suspension assembly 20 to the cab frame 23 during operation of the work vehicle 10.

It should be appreciated that, for purposes of description, the disclosed suspension assembly 20 will generally be described with reference to the work vehicle 10 shown and described above with reference to FIG. 1. However, in other embodiments, the suspension assembly 20 may generally be configured for use with any other suitable work vehicle having any other suitable vehicle configuration. Similarly, for purposes of description, the disclosed vibration dampening system 100 will generally be described herein with reference to the work vehicle 10 shown and described above with reference to FIG. 1 and the suspension assembly 20 shown and described with reference to FIGS. 2-6. However, in other embodiments, the vibration dampening system 100 may generally be configured for use with any other suitable work vehicle having any other suitable vehicle configuration and/or any other suitable suspension assembly having any other suitable suspension configuration.

In general, the suspension assembly 20 may define a framework structure that is intended to be coupled between the chassis 16 and the cab 18. As shown, the assembly 20 may generally include a suspension superstructure 22 configured to rest just below the cab 16 when assembled on the vehicle 10. The superstructure 22 may include a plurality of mounting interfaces 25 for supporting matching mounting structures on the cab frame 23 (see, e.g., FIG. 6). Each mounting interface 25 may include a flattened area or pad 24, with each pad 24 being positioned at one of four corners of the assembly 20. Additionally, the superstructure 22 may include a plurality of cylindrical outer tubes 26 extending from the pads 24. For example, as particularly shown in FIG. 4, each outer tube 26 may extend outwardly from a bottom surface 27 of one of the pads 24.

Moreover, the superstructure 22 may include one or more support structures 29 extending at least partially between the locations of the mounting interfaces 25, such as at least partially between adjacent mounting interfaces 25. For example, the support structures 29 may include various rods and/or links configured to extend between the pads 24 and/or tubes 26. Specifically, as shown, in one embodiment, the support structures 29 may include tie rods or cross links 28 extending between one or more of the pads 24 and/or outer tubes 26 in order to maintain the spatial relationship between the pads 24 prior to mounting the cab 18 onto the superstructure 22. In certain embodiments, the cross links 28 may be connected to the pads 24 and/or tubes 26 using a welded connection, bolts, brackets, or any other suitable connection. Additionally, in one embodiment, the support structures 29 may include one or more lateral links 30 provided on either side of the superstructure 22 for control of longitudinal suspension motion. For example, as particularly shown in FIG. 4, the lateral links 30 may be pivotally connected to the bottom surface 27 of the pads 24.

Further, the support structures 29 may also include various suspension links 31 configured to extend from the locations of the mounting interfaces 25, such as from the pads 24 and/or the outer tubes 26, to the chassis frame 21 of the chassis 16 of the work vehicle 10, thereby providing a load path between the suspension assembly 20 and the chassis frame 21. For example, a rear link 32 may tie one of the rear pads 24 to the chassis frame 21. In certain embodiments, as shown in FIG. 4, the rear link 32 may be pivotally connected to the bottom surface 27 of one of the pads 24 (and/or the outer tubes 26) at a first end or end portion 33 of the link 32. In such embodiments, an opposed second end or end portion 35 of the link 32 may be configured to be coupled to the chassis frame 21, such as via an associated mounting bracket 38 configured to be coupled between the rear link 32 and the chassis frame 21. Similarly, a front link 34 may tie one of the front pads 24 to the chassis frame 21. For example, the front link 34 may be pivotally coupled to one of the front pads 24 and/or outer tubes 26 at a first end or end portion 33 of the link 34 and to the chassis frame 21 at its opposed second end or end portion 35 (e.g., via another bracket 38 coupled between the link 34 and the chassis frame 21).

Beneath the superstructure 22, the suspension assembly 20 may also include mounting assemblies 36 configured to support the superstructure 22 (and the cab 18) on the chassis 16, as will be described below. Additionally, a damper 44 may be disposed at each corner of the suspension assembly 20 to provide dampening of suspension motion. These dampers 44 may generally extend between the bottom surface 27 of the pads 24 (or some other superstructure 22 component) and points on the chassis 16 (not shown in FIG. 2) where the suspension assembly 20 is mounted. Moreover, the suspension assembly 20 may also include a plurality of bump stops 70 (e.g., one on each corner) configured to prevent the outer tubes 26 from contacting corresponding suspension platforms 62 (FIG. 5) of the chassis frame 21 during normal vehicle operation while allowing for such contact during a roll-over event.

As particularly shown in FIGS. 3 and 4, each mounting assembly 36 may be at least partially housed within one of the outer tubes 26. Each assembly 36 may include an upper rubber cup 46, a compression spring 48, a lower rubber cup 50, an up-stop 52 and a retaining plate 54. A spacer 56 extends through these elements, and the entire assembly 36 is held in place by a retaining bolt 58 (and a corresponding nut). The upper rubber cup 46 may be configured to maintain the compression spring 48 centered in the outer tube 26 on the suspension superstructure 22. The lower rubber cup 50 may similarly maintain the compression spring 48 centered in an inner cylindrical tube 64 (FIG. 5) of the chassis frame 21. The rubber up-stop 52 may control upward suspension motion, while the lower retaining plate 54 may accept forces on the structure 22 when placed in compression by the bolt 56.

As particularly shown in FIG. 5, the suspension assembly 20 is configured to be installed on the chassis frame 21 of the vehicle chassis 16. The particular configuration of the chassis frame 21 shown in FIG. 5 is merely illustrated to provide one example of a suitable chassis frame 21. Thus, it should be appreciated that the present subject matter may generally be utilized with any suitable frame configuration.

As shown in FIG. 5, the chassis frame 21 may include a plurality of suspension platforms 62 configured to support the weight of the assembly 20 (and the cab 16). Each platform 62 may generally be configured to be aligned with one of the pads 24 when the superstructure 22 is installed onto the frame 60. Additionally, a cylindrical, inner tube 64 may extend upwardly from each platform 62 such that the inner tubes 64 are received within the outer tubes 26 when the pads 24 and platforms 62 are properly aligned during assembly. Moreover, as indicated above, the mounting brackets 38 for the front and rear links 32, 34 may be coupled to the chassis frame 21 (e.g., at the adjacent platforms 62) to provide a direct load transfer path between the chassis frame 21 and the suspension superstructure 22 via the links 32, 34.

As shown in FIG. 5, the chassis frame 21 generally extends lengthwise between a front end 65 and a rear end 66 and laterally between opposed first and second sides 67, 68 extending between the front and rear ends 65, 66 of the frame 21. Additionally, the chassis frame 21 includes an opposed pair of sidewalls 70, 72 extending along the sides 67, 68 of the frame 21. Specifically, as shown, the chassis frame 21 includes a first sidewall 70 extending lengthwise along the first side 67 of the frame 21 between its front and rear ends 65, 66. Similarly, the chassis frame 21 includes a second sidewall 72 extending lengthwise along the second side 68 of the frame 21 between its front and rear ends 65, 66. Moreover, the chassis frame 21 may also include one or more cross-beams 71 extending between the first and second sidewalls 70, 72. The cross-beam(s) 71 may position the first and second sidewalls 70, 72 relative to each other at a fixed distance. Further, the cross-beam(s) 71 may increase the rigidity and/or stiffness of the chassis frame 21. In certain embodiments, the cross-beam(s) 71 may also provide structure to attach components of the work vehicle 10.

As indicated above, the cab frame 23 of the operator's cab 18 of the work vehicle 10 may be configured to be mounted on top of the suspension assembly 20. As shown in FIG. 6, the cab frame 23 may generally include a plurality of structural members 74, 76 configured to be coupled together to form a structural frame-like assembly having a front side 78, a rear side 80, and first and second lateral sides 82, 84 extending between the front and rear sides 78, 80. Specifically, in the illustrated embodiment, the cab frame 23 includes vertically extending frame members 74 disposed at each corner of the frame 23 and a plurality of cross-wise frame members 76 coupled between the vertically extending frame members 74 along the sides 78, 80, 82, 84 of the frame 23. It should be recognized that the cab frame 23 may also include one or more secondary structural members (not shown) coupled between the various frame members 74, 76 to add stiffness or rigidity to the cab frame 23 or attachment points for various components of the cab 18. Moreover, the cab frame 23 may include a plurality of mounting feet 94 for coupling the frame 23 to the chassis frame 21 via the suspension assembly 20. For example, in the illustrated embodiment, the cab frame 23 includes a mounting foot 94 positioned at each corner of the frame 23. In such an embodiment, as shown in FIG. 6, each mounting foot 94 may be configured to be aligned with and supported by one of the pads 24 of the suspension superstructure 22 at each associated mounting interface 25 (FIGS. 2 and 3).

As indicated above, FIGS. 2-6 also illustrate various components and/or features of one or more embodiments of a vibration dampening system 100 for reducing the amount of vibrational energy transmitted from the chassis frame 21 through the suspension assembly 20 to the cab frame 23 during operation of the work vehicle 10. In several embodiments, the system 100 may include any combination of the suspension assembly 20, the chassis frame 21, and the cab frame 23, including any sub-combination of the various components forming the suspension assembly 20, the chassis frame 21, and/or the cab frame 23. Additionally, in accordance with aspects of the present subject matter, the system 100 may also include one or more dampening components or dampers 102, 104, 106 provided in operative association with the chassis frame 21, the cab frame 23, and/or the suspension assembly 20. In general, the dampers 102, 104, 106 may be configured to dampen or otherwise reduce the vibrations transmitted through the component(s) with which it is associated, thereby reducing the overall amount of vibrations being transmitted to the cab 18 during operation of the work vehicle 10. As a result, the amount of vibrations felt by the operator and the amount of noise generated within the cab, may significantly be reduced, thereby increasing operator comfort and reducing operator fatigue In several embodiments, the system 100 may include one or more vibration dampers 102 provided in operative association with one or more components of the suspension assembly 20. For example, in one embodiment, one or more dampers 102 may be installed relative to one or more of the support structures 29 of the suspension superstructure 22. For example, as shown in FIGS. 2-4, a vibration damper(s) 102 may be provided in operative association with each of the suspension links 32, 34 of the suspension superstructure 22. In such an embodiment, given that the links 32, 34 provide a load path between the chassis frame 21 and the suspension assembly 20, the vibration dampers 102 may be configured to reduce the amount of vibration transmitted from the chassis frame 21 to the suspension assembly 20, which, in turn, provides for a reduction in the amount vibrations ultimately transmitted to the cab 18 via the connection between the cab frame 23 and the suspension assembly 20. As will be described below, in one embodiment, the vibration dampers 102 provided in association with each link 32, 34 may correspond to an elastomeric damper formed from an elastomeric material configured to reduce the amount of vibrations transmitted through the associated link 32, 34.

It should be appreciated that, although the vibration dampers 102 will generally be described herein with reference to the front and/or rear links 34, 32 of the suspension superstructure 22, the dampers 102 may generally be provided in operative association with any other support structures 29 or other components of the suspension superstructure 22 to reduce the amount of vibrations transmitted therethrough.

In addition to the vibration dampers 102 provided in association with the suspension assembly 20 (or as an alternative thereto), one or more vibration dampers 104 may be provided in operative association with the chassis frame 21. For example, in one embodiment, one or more dampers 104 may be installed between structural members extending along opposed sides of the chassis frame 21 to reduce the amount of vibration transmitted therebetween. Specifically, as shown in FIGS. 5 and 6, a vibration damper(s) 104 may be coupled between the opposed sidewalls 70, 72 of the chassis frame 21. In such an embodiment, as the sidewalls 70, 72 of the chassis frame 21 vibrate relative to one another, at least a portion of the vibrational energy will pass through the damper(s) 104 and get converted into heat or may otherwise be absorbed by the damper(s) 104, thereby reducing the amount of vibration that can be transmitted to the cab 18 of the work vehicle 10 via the chassis frame 21 and associated suspension assembly 20. Alternatively, the damper(s) 104 may be coupled between or installed relative to any other components and/or features of the chassis frame 21. As will be described below, in one embodiment, the damper(s) 104 may be configured as a passive or active damper, such as a shock absorber(s) or actuator(s), to reduce vibrations transmitted through the chassis frame 21.

Moreover, in addition to the vibration dampers 102 provided in association with the suspension assembly 20 and/or the vibration dampers 104 provided in association with the chassis frame 21 (or as an alternative thereto), one or more vibration dampers 106 may be provided in operative association with the cab frame 23. For example, in one embodiment, one or more dampers 106 may be installed between structural members extending along opposed sides 78, 80, 82, 84 of the cab frame 23 to reduce the amount of vibration transmitted therebetween. Specifically, as shown in FIG. 6, a vibration damper(s) 106 may be coupled directly between opposed cross-wise frame members 76 of the cab frame 23, such as from a given cross-wise frame member 76 extending along the first lateral side 82 of the frame 23 to an opposed cross-wise frame member 76 extending along the second lateral side 84 of the frame 24. Alternatively, a vibration damper(s) 106 may be installed front-to-rear between opposed cross-wise frame members 76 of the cab frame 23, such as from a given cross-wise frame member 76 extending along the front side 78 of the frame 23 to an opposed cross-wise frame member 76 extending along the rear side 80 of the frame 23. In further embodiments, a vibration damper(s) 106 may be coupled directly between two of the vertically extending frame members 74, such as between an adjacent pair of vertically extending frame members 74 across the front side 78, the first lateral side 82, the second lateral side 84, and/or the rear side 80 of the frame 23. As will be described below, in one embodiment, the damper(s) 106 may be configured as a passive or active damper, such as a shock absorber(s) or actuator(s), to reduce vibrations transmitted through the cab frame 23.

Figure 7:
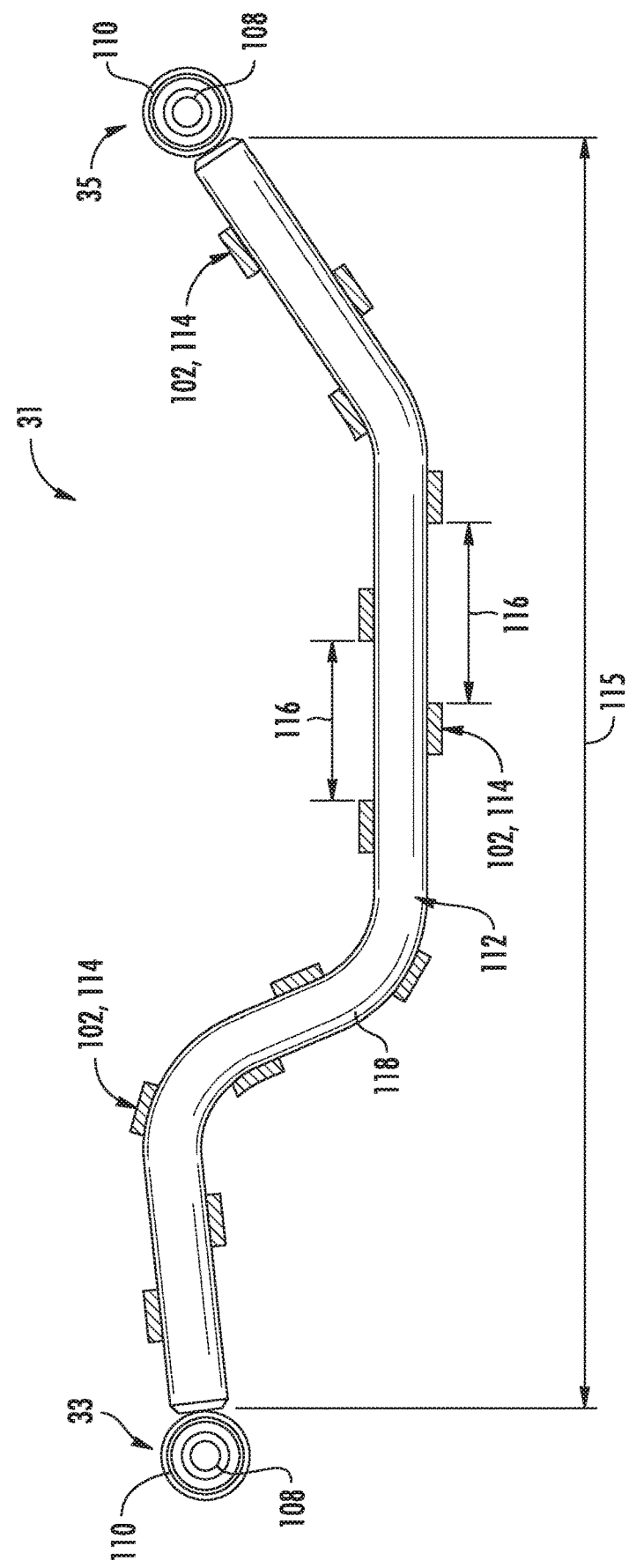
FIG. 7 illustrates a partial cross-sectional view of one of the links of the suspension assembly shown in FIGS. 2 and 3, particularly illustrating one embodiment of an elastomeric vibration damper that may be provided in operative association with the link to reduce the amount of vibrations transmitted therethrough in accordance with aspects of the present subject matter.
Figure 8:
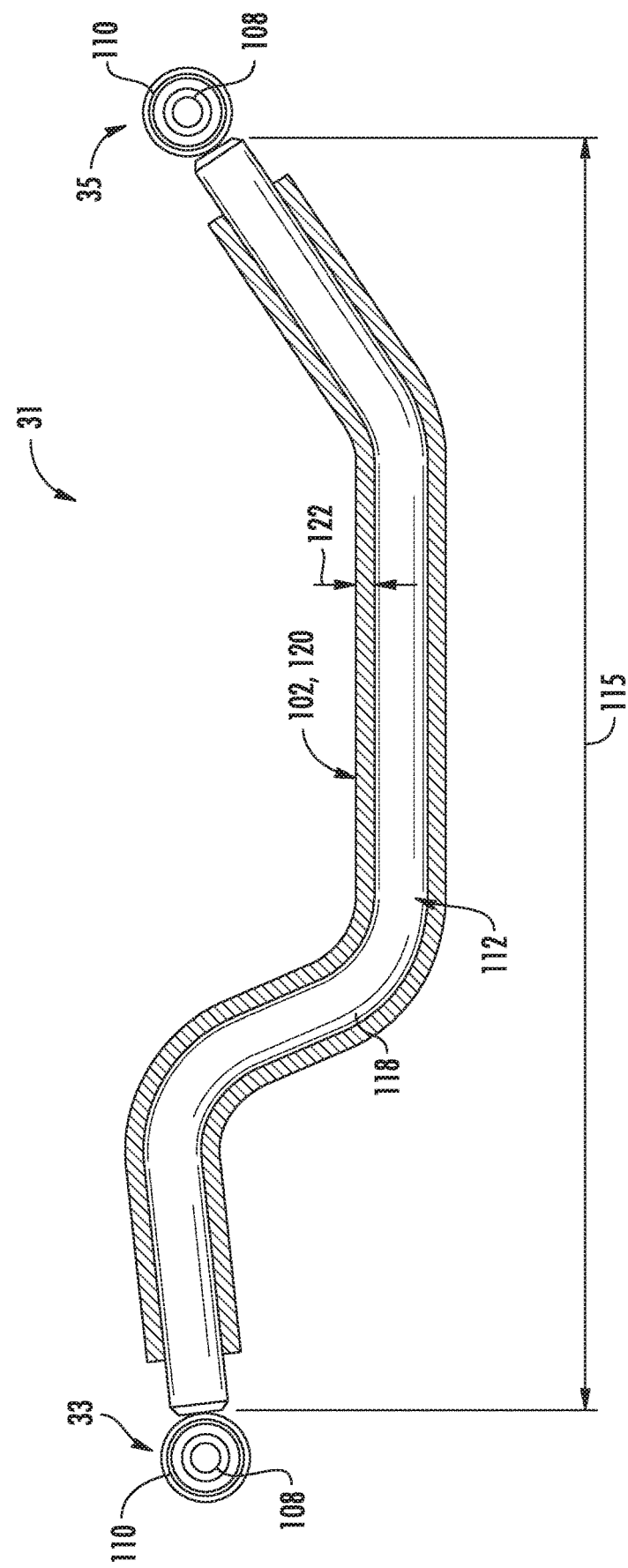
FIG. 8 illustrates another partial cross-sectional view of the suspension link shown in FIG. 7, particularly illustrating another embodiment of an elastomeric vibration damper that may be provided in operative association with the link to reduce the amount of vibrations transmitted therethrough in accordance with aspects of the present subject matter.

Referring now to FIG. 7, a side view of one of the suspension links 31 of the suspension structure 22 (e.g., the rear link 32 or the front link 34) shown in FIGS. 2-4 is illustrated in accordance with aspects of the present subject matter, particularly illustrating a vibration damper(s) 102 (in cross-section) provided in association with the link 31. As indicated above, the link 31 may generally be configured to extend lengthwise between a first end or end portion 33 and an opposed second end or end portion 35, with one of the end portions 33, 35 configured to be coupled to a component of the suspension assembly 22 (e.g., one of the pads 24 or upper tubes 26) and the opposed end portion configured to be coupled to the chassis frame 21 (e.g., via the associated mounting bracket 38). For instance, as shown in FIG. 7, a fastener opening 108 may be defined through each end portion 33, 35 of the link 31 for receiving a fastener configured to couple the link 31 to an adjacent component of the suspension assembly 20 or chassis frame 21. Additionally, each end portion 33, 35 may include an elastomeric isolator 110 positioned around the fastener opening 108 at the attachment interface defined between the link 31 and the adjacent component.

Moreover, as shown in FIG. 7, the link 31 may also include a connector portion 112 extending lengthwise between the opposed end portions 33, 35. In general, the connector portion 112 may correspond to the element or portion of the link 31 providing the structural connection between the opposed end portions 33, 35 and, thus, the components of the suspension assembly 20 or chassis frame 21 coupled thereto. As such, the connector portion 212 generally functions as the structural element of the link 31 extending between the attachment interfaces provided at the opposed end portions 33, 35 between the link 31 and the adjacent components.

In accordance with aspects of the present subject matter, one or more vibration damper(s) 102 may be installed along all or a section of the connector portion 112 of the link 31 to provide vibration damping between the opposed end portions 33, 35. For example, as shown in FIG. 7, an elastomeric vibration damper 102 is installed along all or a substantial portion of a length 115 of the connector portion 112 such that the damper 102 generally extends from a location adjacent to the first end portion 33 of the link 31 to a location adjacent to the second end portion 35 of the link 31. Specifically, in the illustrated embodiment, the vibration damper 102 is configured as a strip 114 of elastomeric material that is wrapped around the connector portion 112 of the link 31 in a spiral pattern between the opposed end portions 33, 35. In such an embodiment, one or more gaps 116 may be defined between adjacent sections or wraps of the strip 114 along the length 115 of the connector portion 112 at which an outer surface 118 of the link 31 is exposed. It should be appreciated that the size and/or number of gaps 116 provided along the length 115 of the connector portion 112 may generally vary depending on the manner in which the elastomeric strip 114 of material is wrapped around link 31.

It should also be appreciated that the vibration damper 102 may be coupled or secured to the connector portion 112 along the outer surface 118 of the link 31 using any suitable attachment means and/or methodology. For example, in one embodiment, the vibration damper 102 may be adhered to the outer surface 118 of the link 31, such as by using a suitable adhesive. In other embodiments, the damper 102 may be coupled to the link 31 using mechanical fasteners (e.g., bolts, screws, rivets) or other fastening methods. Alternatively, the vibration damper 102 may be applied or molded onto the outer surface 118 of the link 31 using any suitable manufacturing method/process.

It should also be appreciated that, in several embodiments, the elastomeric material or elastomer used to form the vibration damper(s) 102 described herein may generally correspond to a polymer having viscoelastic properties and may also exhibit a relatively low Young's modulus, weak inter-molecular forces, and/or a high failure strain. For example, a suitable elastomeric material may correspond to a rubber material. In other embodiments, the elastomeric material may correspond to a thermoplastic material or a thermoset material requiring vulcanization. In other embodiments, suitable elastomeric materials may correspond to any other suitable plastic and/or polymer materials that exhibit desired viscoelastic properties. As a result, the elastomeric material of the vibration damper(s) 102 may undergo viscoelastic deformation when exposed to the vibrations acting on the work vehicle 10. For example, the vibrations of the chassis frame 21 may travel through the link 31 to the suspension assembly 20 and eventually to the cab frame 23. The elastomeric vibration damper(s) 102 installed on the link 31 may, thus, reduce the vibration transferred between the chassis frame 21 and the cab frame 23. For example, a portion of the energy of the vibration may act as a stress on the elastomeric vibration damper 102 and may be dissipated by heat due to the viscoelastic properties of the elastomeric material used to form the damper 102.

Figure 9:
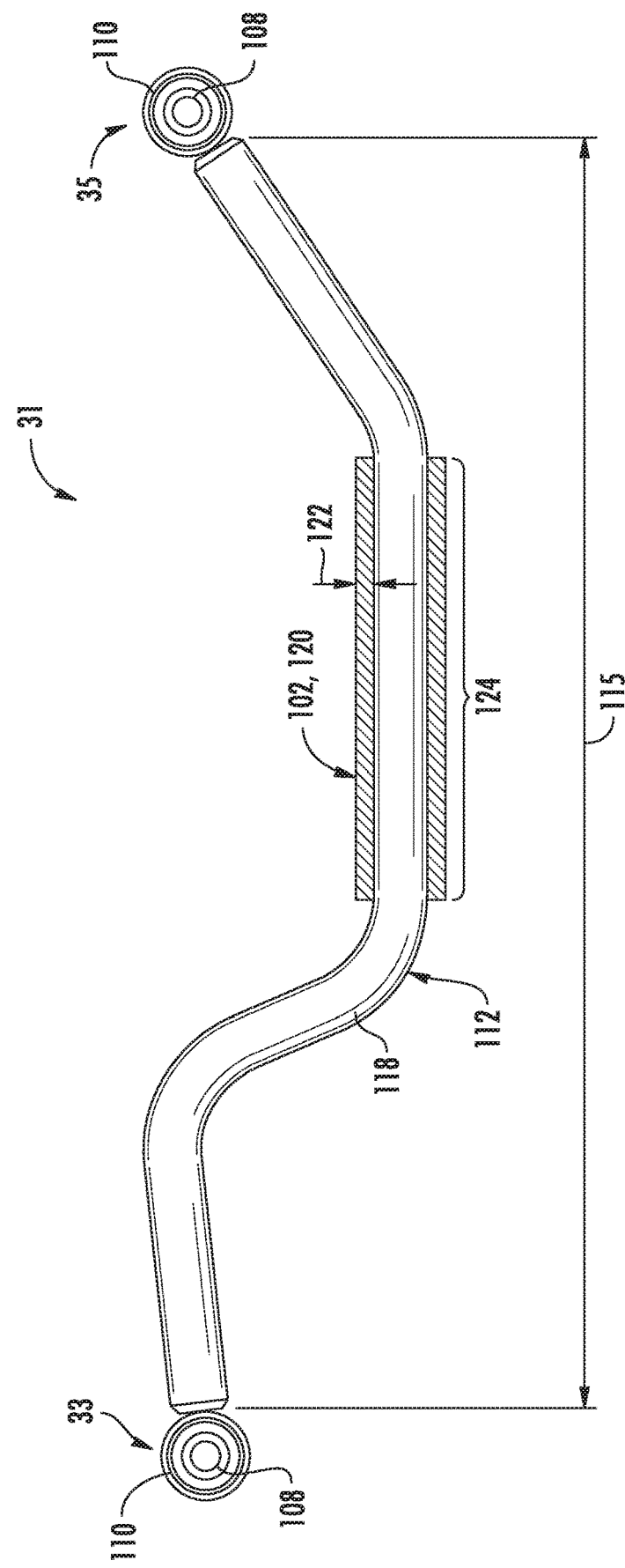
FIG. 9 illustrates another partial cross-sectional view of the suspension link shown in FIG. 7, particularly illustrating a further embodiment of an elastomeric vibration damper that may be provided in operative association with the link to reduce the amount of vibrations transmitted therethrough in accordance with aspects of the present subject matter.

Referring now to FIGS. 8-13, various views of alternative embodiments of elastomeric vibration dampers 102 that may be installed relative to one of the links 31 of the suspension assembly 20 are illustrated in accordance with aspects of the present subject matter. For example, in the embodiment shown in FIG. 8, the vibration damper 102 corresponds to a continuous sleeve 120 of elastomeric material of substantially uniform thickness 122 that coats, covers or otherwise encompasses the connector portion 112 of the link 31 along the length 115 defined between the opposed end portions 33, 35. As such, in contrast to the spiral damper configuration described above with reference to FIG. 7, the vibration damper 102 may cover or envelop all or a substantial section of the connector portion 112 of the link 31. For example, in the illustrated embodiment, the elastomeric sleeve 120 formed by the vibration damper 102 generally extends along the length 115 of the connector portion 112 from a location generally adjacent to the first end portion 33 of the link 31 to a location generally adjacent to the second end portion 35 of the link 31. However, in an alternative embodiment, the elastomeric sleeve 120 may be configured to extend along a longer or shorter section of the connector portion 112. For example, FIG. 9 illustrates an embodiment in which the elastomeric sleeve 120 forming the vibration damper 102 covers only a short section of the connector portion 112, such as a central section 124 of the connector portion 112.

It should be appreciated that, as used herein, the thickness 122 of the vibration damper 102 is considered to be substantially uniform if the total variation in the thickness 122 across the length of the damper 102 is less than 10%, such as less than 5% or less than 2% or less than 1%.

Figure 10:
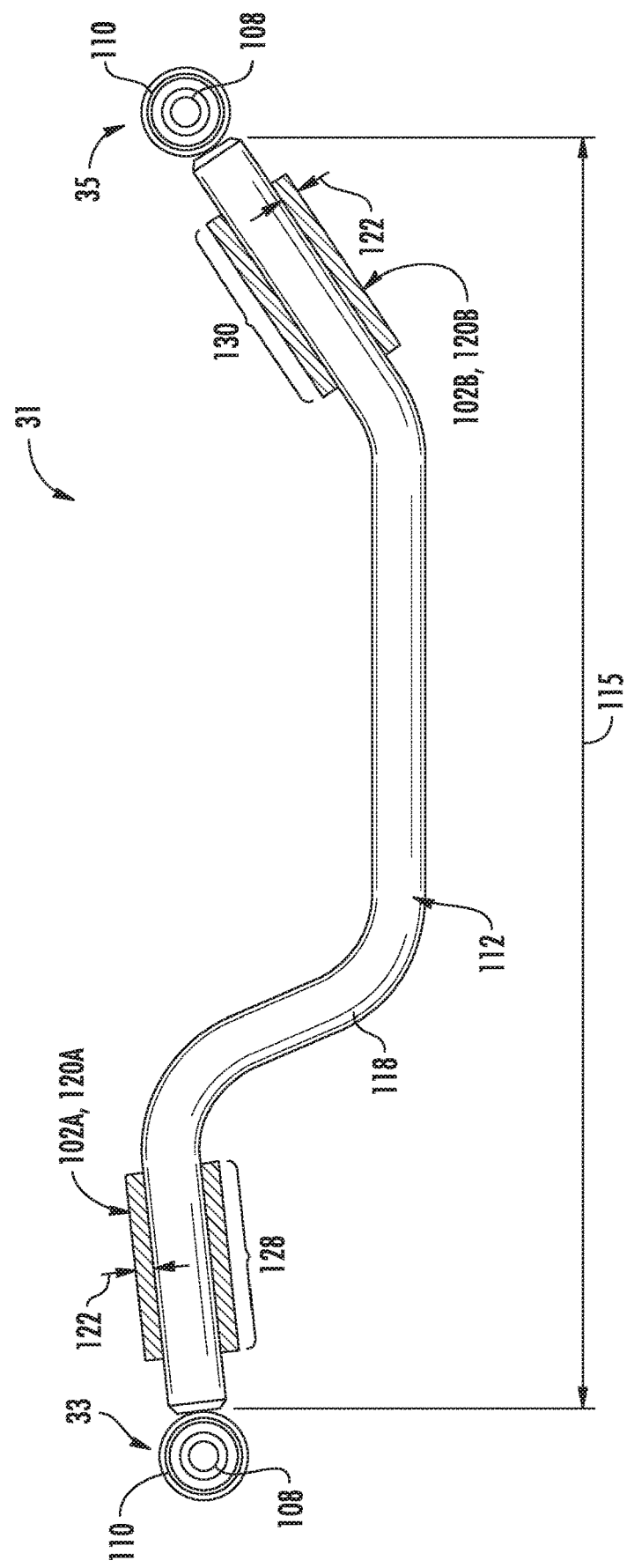
FIG. 10 illustrates another partial cross-sectional view of the suspension link shown in FIG. 7, particularly illustrating yet another embodiment of elastomeric vibration dampers that may be provided in operative association with the link to reduce the amount of vibrations transmitted therethrough in accordance with aspects of the present subject matter.

Similarly, in the embodiment shown in FIG. 10, as opposed to including a single elastomeric sleeve forming a vibration damper, the link 31 includes two separate vibration dampers 102A, 102B provided in association therewith, with each damper 102A, 102B being configured as an elastomeric sleeve 120 of substantially uniform thickness. Specifically, as shown in FIG. 10, a first elastomeric sleeve 120A forming a first vibration damper 102A is installed relative to the link 31 so as to cover or encompass a first section 128 of the connector portion 112 of the link 31, such as a section of the connector portion 112 extending from or adjacent to the first end portion 33 of the link 31. Additionally, a second elastomeric sleeve 120B forming a second vibration damper 102B is installed relative to the link 31 so as to cover or encompass a second section 130 of the connector portion 112 of the link 31, such as a section of the connector portion 112 extending from or adjacent to the second end portion 35 of the link 31. In such an embodiment, the separate vibration dampers 102A, 102B may be spaced from each other along the length 115 of the connector portion 112. Of course, it should be appreciated that, in other embodiments, any other suitable number of separate elastomeric vibration dampers 102 may be provided in association with the connector portion 112 of the link 31, such as three or more dampers 102 spaced apart from one another along the length 115 of the connector portion 112.

Figure 11:
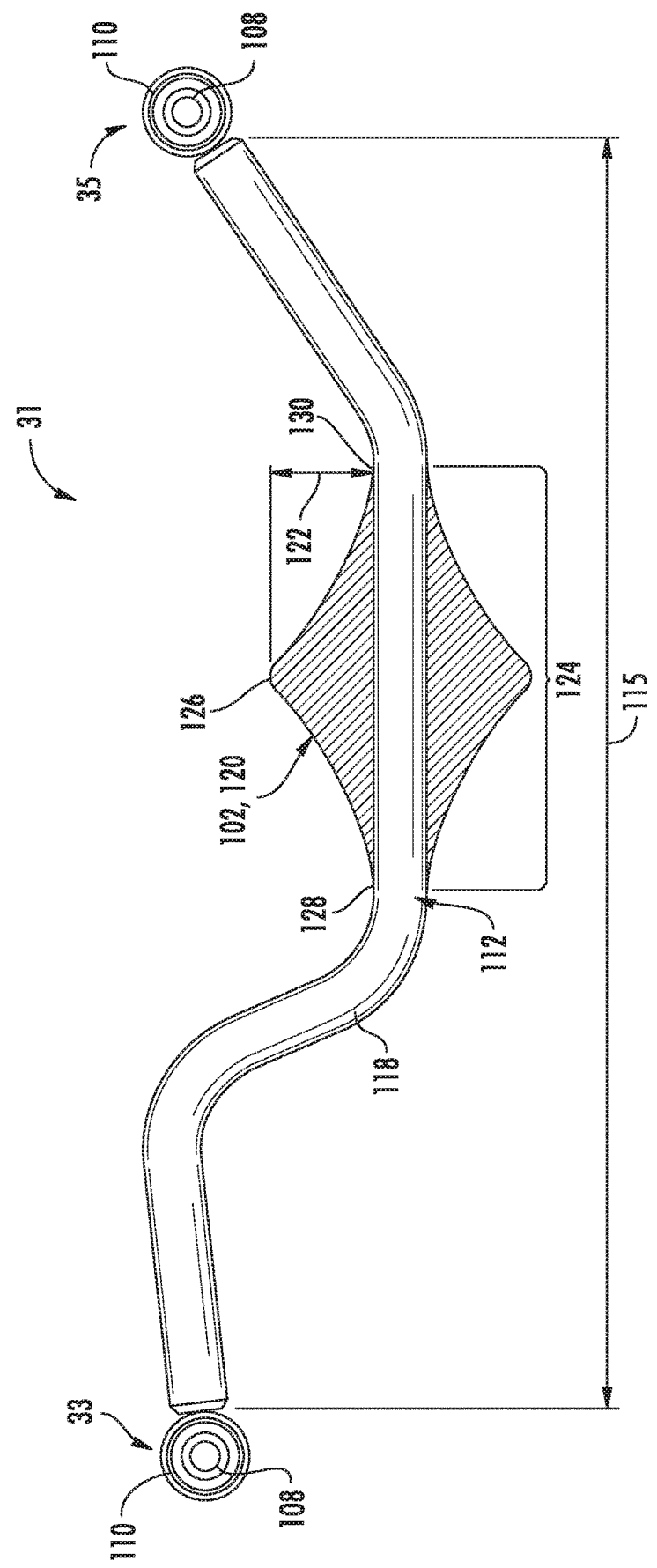
FIG. 11 illustrates another partial cross-sectional view of the suspension link shown in FIG. 7, particularly illustrating an even further embodiment of an elastomeric vibration damper that may be provided in operative association with the link to reduce the amount of vibrations transmitted therethrough in accordance with aspects of the present subject matter.

Additionally, FIG. 11 illustrates an alternative embodiment of the centrally located vibration damper 102 described above with reference to FIG. 9. As shown in FIG. 11, as opposed to being formed by an elastomeric sleeve of substantially uniform thickness, the vibration damper 102 is formed by an elastomeric sleeve 120 having a non-uniform thickness 122 along its length. Specifically, in the illustrated embodiment, the vibration damper 102 generally defines a spade-like cross-sectional shape, with the thickness 122 of the elastomeric material forming the sleeve 120 generally tapering from a maximum thickness at or adjacent to a center 126 of the damper 102 to a minimum thickness at its opposed first and second damper ends 128, 130.

Figure 12:
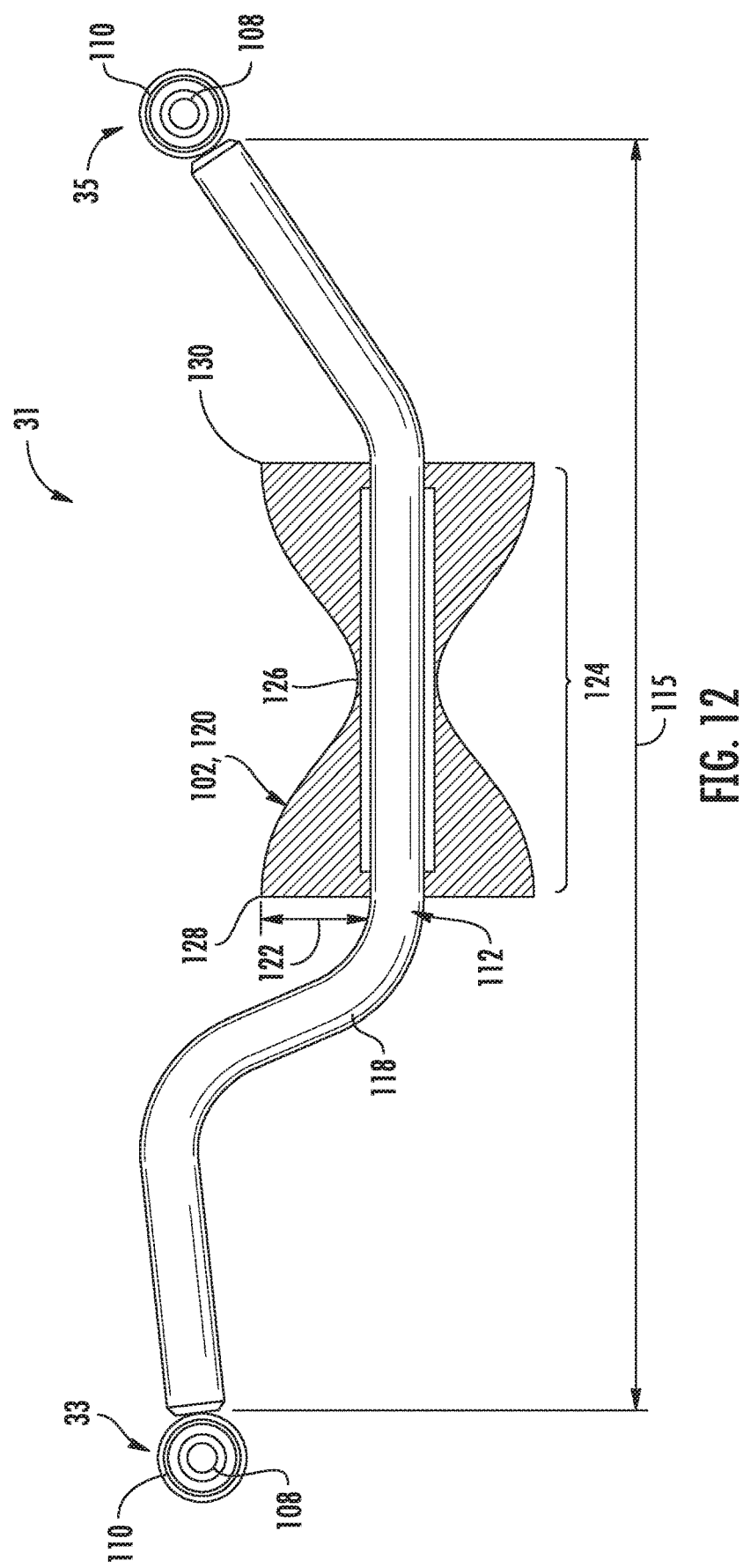
FIG. 12 illustrates another partial cross-sectional view of the suspension link shown in FIG. 7, particularly illustrating another embodiment of an elastomeric vibration damper that may be provided in operative association with the link to reduce the amount of vibrations transmitted therethrough in accordance with aspects of the present subject matter.

Moreover, FIG. 12 illustrates another embodiment of a vibration damper 102 formed from an elastomeric sleeve 120 of non-uniform thickness 122. As shown in FIG. 12, unlike the spade-like cross-sectional shape shown in FIG. 11, the vibration damper 102 generally defines a nozzle-like cross-sectional shape, with the thickness 122 of the elastomeric material forming the sleeve 120 generally tapering from maximum thicknesses at its opposed first and second damper ends 128, 130 to a minimum thickness at or adjacent to the center 126 of the damper 102.

Figure 13:
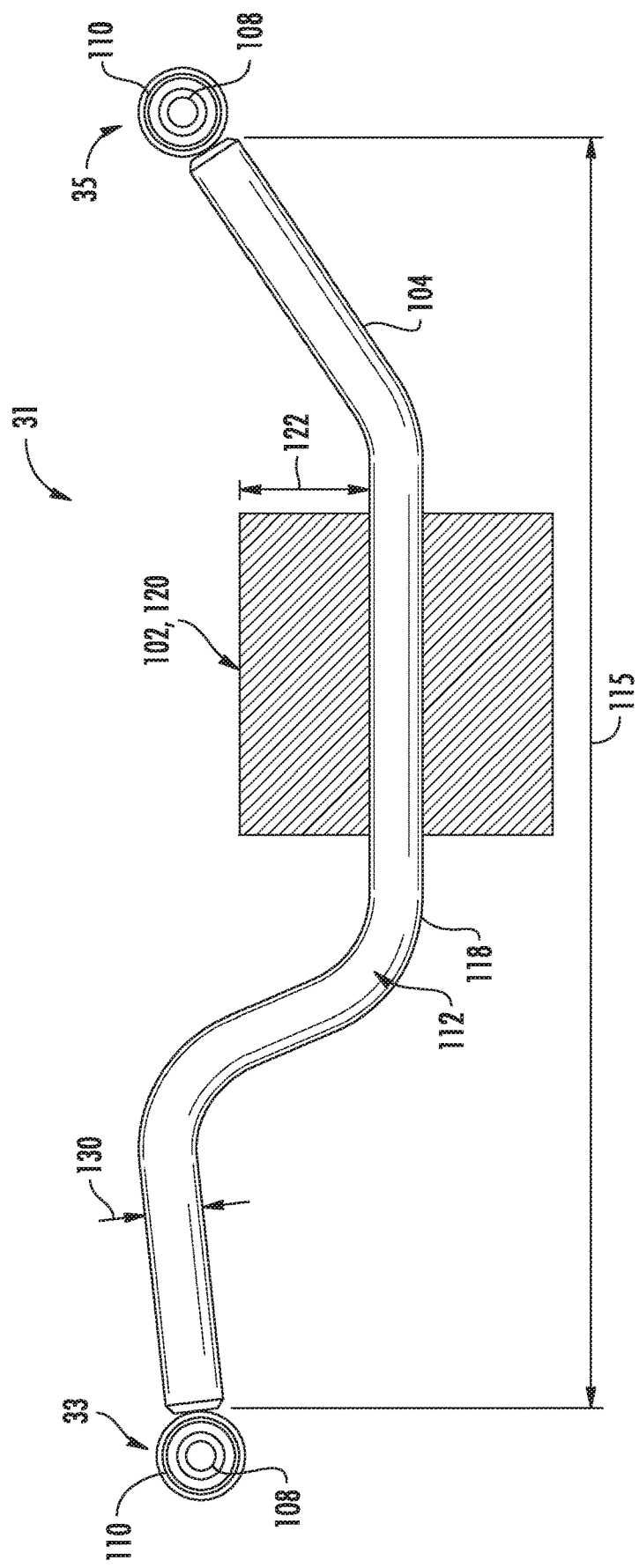
FIG. 13 illustrates another partial cross-sectional view of the suspension link shown in FIG. 7, particularly illustrating a further embodiment of an elastomeric vibration damper that may be provided in operative association with the link to reduce the amount of vibrations transmitted therethrough in accordance with aspects of the present subject matter.

Further, FIG. 13 illustrates another variation of the centrally located vibration damper 102 described above with reference to FIG. 9. As shown in FIG. 13, similar to the embodiment shown in FIG. 9, the elastomeric sleeve 120 forming the vibration damper 102 has a substantially uniform thickness 122. However, the thickness 122 of the sleeve 120 is significantly increased as compared to that shown in FIG. 9. For example, the thickness 122 of the sleeve 120 shown in FIG. 12 is greater than an overall thickness 130 of the link 31 whereas the thickness 122 of the sleeve 120 shown in FIG. 9 is less than the overall thickness 130 of the link 31.

It should be appreciated that the various embodiments of the vibration dampers 102 shown in FIGS. 8-13 are described to provide example configurations of suitable dampers. However, in other embodiments, the elastomeric vibration damper(s) 102 provided in association with the suspension link(s) 31 may have any other suitable configuration that allows the damper(s) 102 to reduce the amount of vibrations being transmitted through the link(s). For example, as opposed to a full sleeve configuration, the vibration damper(s) 102 may have voids or spaces defined through the elastomeric material at one or more locations along the length of the damper(s) 102.

Figure 14:
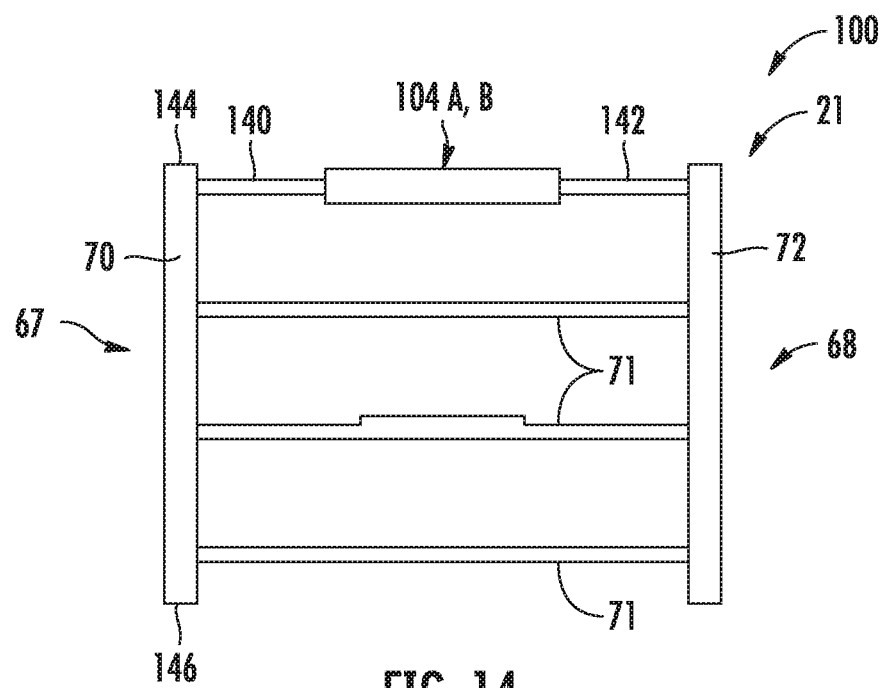
FIG. 14 illustrates a rear, schematic view of the chassis frame shown in FIGS. 5 and 6, particularly illustrating one or more vibration dampers installed between opposed sides of the chassis frame in accordance with aspects of the present subject matter.
Figure 15:
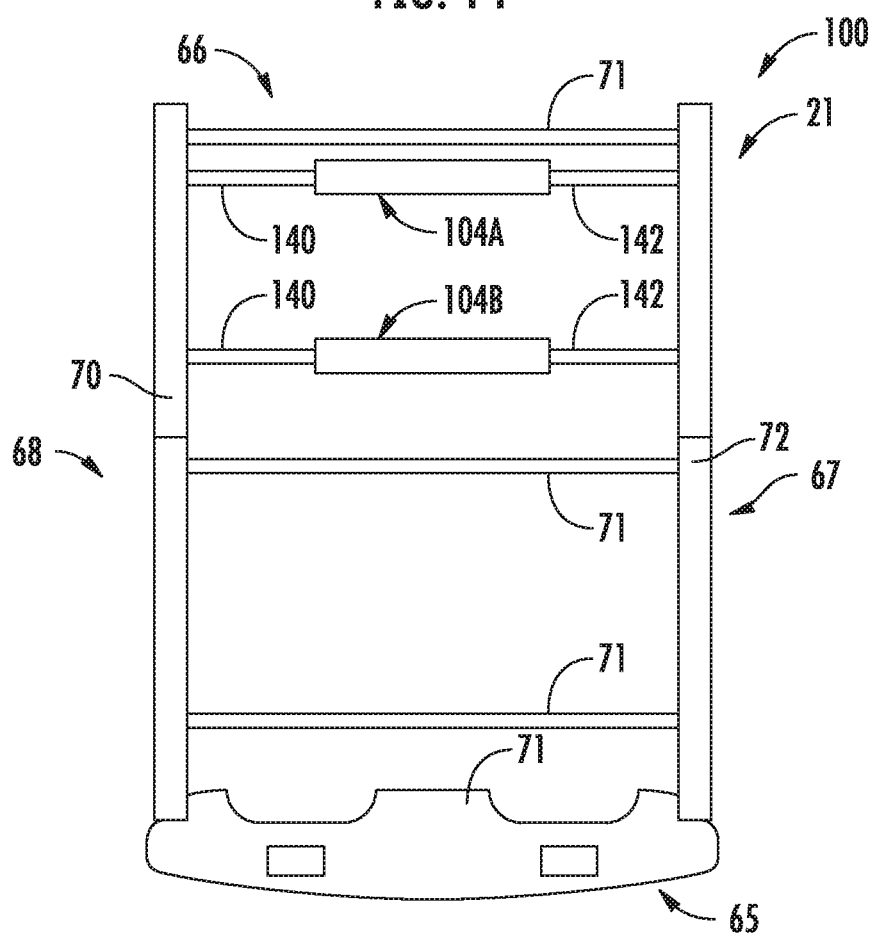
FIG. 15 illustrates a top, schematic view of the chassis frame shown in FIGS. 5 and 6, particularly illustrating the vibration dampers extending between the opposed sides of the chassis frame.

Referring now to FIGS. 14 and 15, differing schematic views of the chassis frame 21 described above with reference to FIGS. 5 and 6 are illustrated in accordance with aspects of the present subject matter, particularly illustrating vibration dampers 104 coupled between opposed portions of the frame 21. Specifically, FIG. 14 illustrates a rear view of the chassis frame 21 and FIG. 15 illustrates a top view of the chassis frame 21.

As indicated above, in several embodiments, one or more dampers 104 may be coupled between the opposed sidewalls 70, 72 of the chassis frame 21 to dampen vibrations being transmitting through the frame 21. Specifically, as shown in the illustrated embodiment, first and second vibration dampers 104A, 104B are coupled between the sidewalls 70, 72 of the chassis frame 21, with each damper 104A, 104B extending lengthwise between a first damper end 140 coupled to the first sidewall 70 of the frame 21 and a second damper end 142 coupled to the second sidewall 72 of the frame 21. However, in other embodiments, only a single vibration damper 104 may be coupled between the opposed sidewalls 70, 72 of the chassis frame 21, or three or more vibration dampers 104 may be coupled between the sidewalls 70, 72.

It should be appreciated that the dampers 104 may be coupled to the sidewalls 70, 72 using any suitable attachment means and/or method known in the art. For example, one or more suitable mechanical fasteners (e.g., bolts, screws and/or the like) may be used to secure each damper 104 to the sidewalls 70, 72 at its opposed ends 140, 142. However, in alternative embodiments, the dampers 104 may be coupled to the sidewalls 70, 72 using any other suitable means.

It should also be appreciated that the vibration damper(s) 104 may be configured to be coupled between the sidewalls 70, 72 at any suitable heightwise location along the chassis frame 21. For example, as shown in FIG. 14, the vibrations dampers 104 are generally installed at a location adjacent to a top end 144 of the chassis frame 21. However, in other embodiments, the vibrations dampers 104 may be installed at a location adjacent to a bottom end 146 of the chassis frame 21 or at any suitable heightwise location between the top and bottom ends 144, 146 of the frame 21, such as at a centralized heightwise location between the top and bottom ends 144, 146.

Figure 16:
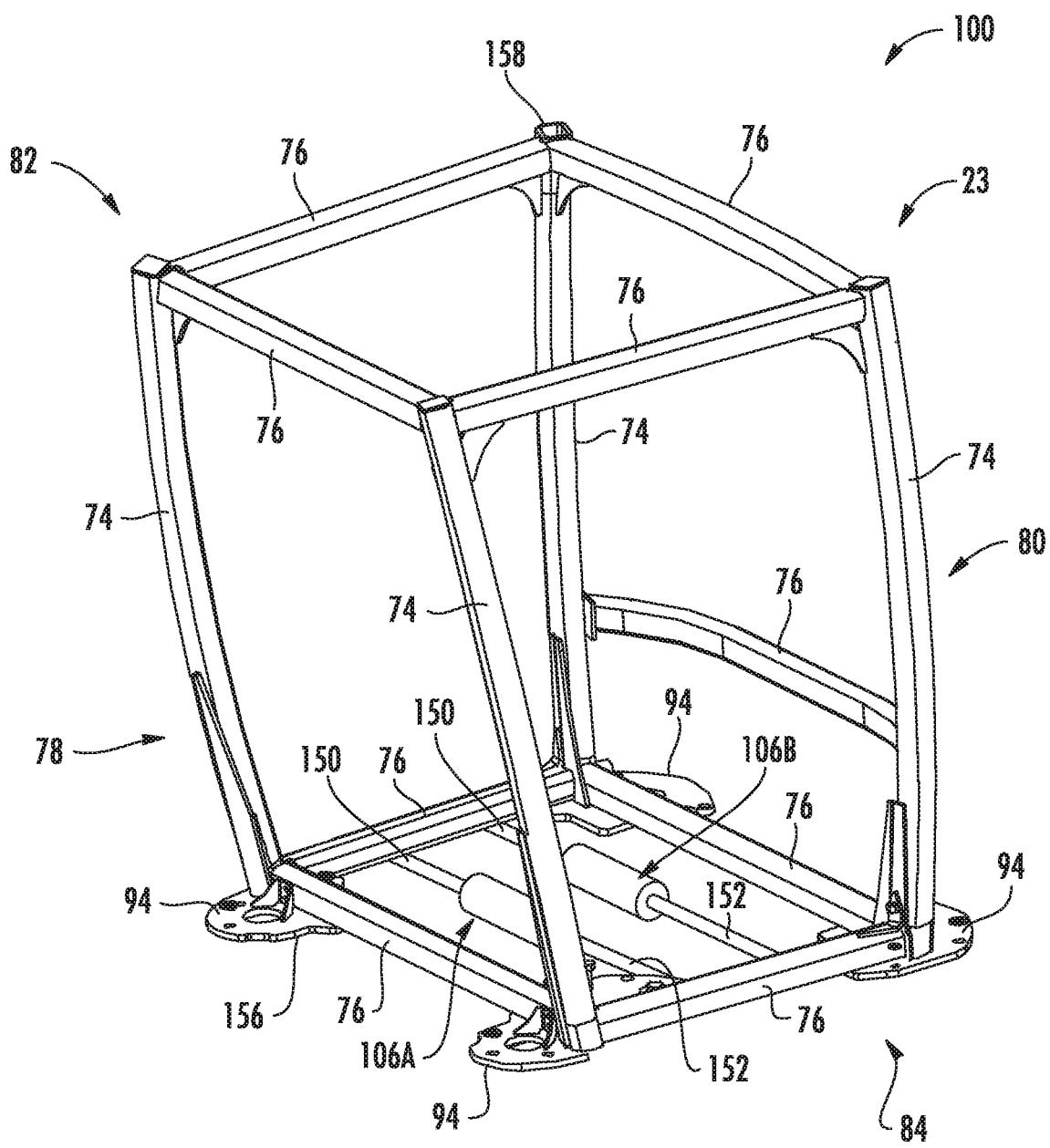
FIG. 16 illustrates a perspective view of the cab frame shown in FIG. 6, particularly illustrating one or more vibration dampers installed between opposed frame members of the chassis frame in accordance with aspects of the present subject matter.

Referring now to FIG. 16, a perspective view of the cab frame 23 described above with reference to FIG. 6 is illustrated in accordance with aspects of the present subject matter, particularly illustrating vibration dampers 106 coupled between opposed portions of the frame 23. As indicated above, in several embodiments, one or more dampers 106 may be coupled between the opposed structural frame members of the cab frame 23 to dampen vibrations being transmitting through the frame 23. Specifically, as shown in the illustrated embodiment, first and second vibration dampers 106A, 106B are coupled between cross-wise frame members 76 positioned along the opposed lateral sides 82, 84 of the cab frame 23, with each damper 106 extending lengthwise between a first damper end 150 coupled to the frame member 76 extending along the first lateral side 82 of the frame 23 and a second damper end 152 coupled to the frame member 76 extending along the second lateral side 84 of the frame 23. However, in other embodiments, only a single vibration damper 106 may be coupled between the opposed frame members 76 of the chassis frame 21 or three or more vibration dampers 106 may be coupled between the frame members 76. Additionally, in other embodiments, the vibration damper(s) 106 may be coupled between any other suitable structural members of the frame 23, such as front-to-rear between opposed cross-wise frame members 76 or side-to-side between a pair of the vertically extending frame members 74.

It should be appreciated that the dampers 106 may be coupled to the frame members 76 using any suitable attachment means and/or method known in the art. For example, one or more suitable mechanical fasteners (e.g., bolts, screws and/or the like) may be used to secure each damper 106 to the cab frame 23 at its opposed ends 150, 152. However, in alternative embodiments, the dampers 106 may be coupled to the frame 23 using any other suitable means.

It should also be appreciated that the vibration damper(s) 106 may be configured to be coupled between opposed frame members 76 at any suitable heightwise location along the cab frame 23. For example, as shown in FIG. 16, the vibrations dampers 106 are generally installed at a location adjacent to a bottom end 156 of the cab frame 23. However, in other embodiments, the vibrations dampers 106 may be installed at a location adjacent to a top end 158 of the cab frame 23 or at any suitable heightwise location between the top and bottom ends 158, 156 of the frame 23, such as at a centralized heightwise location between the top and bottom ends 158, 156.

Figure 17:
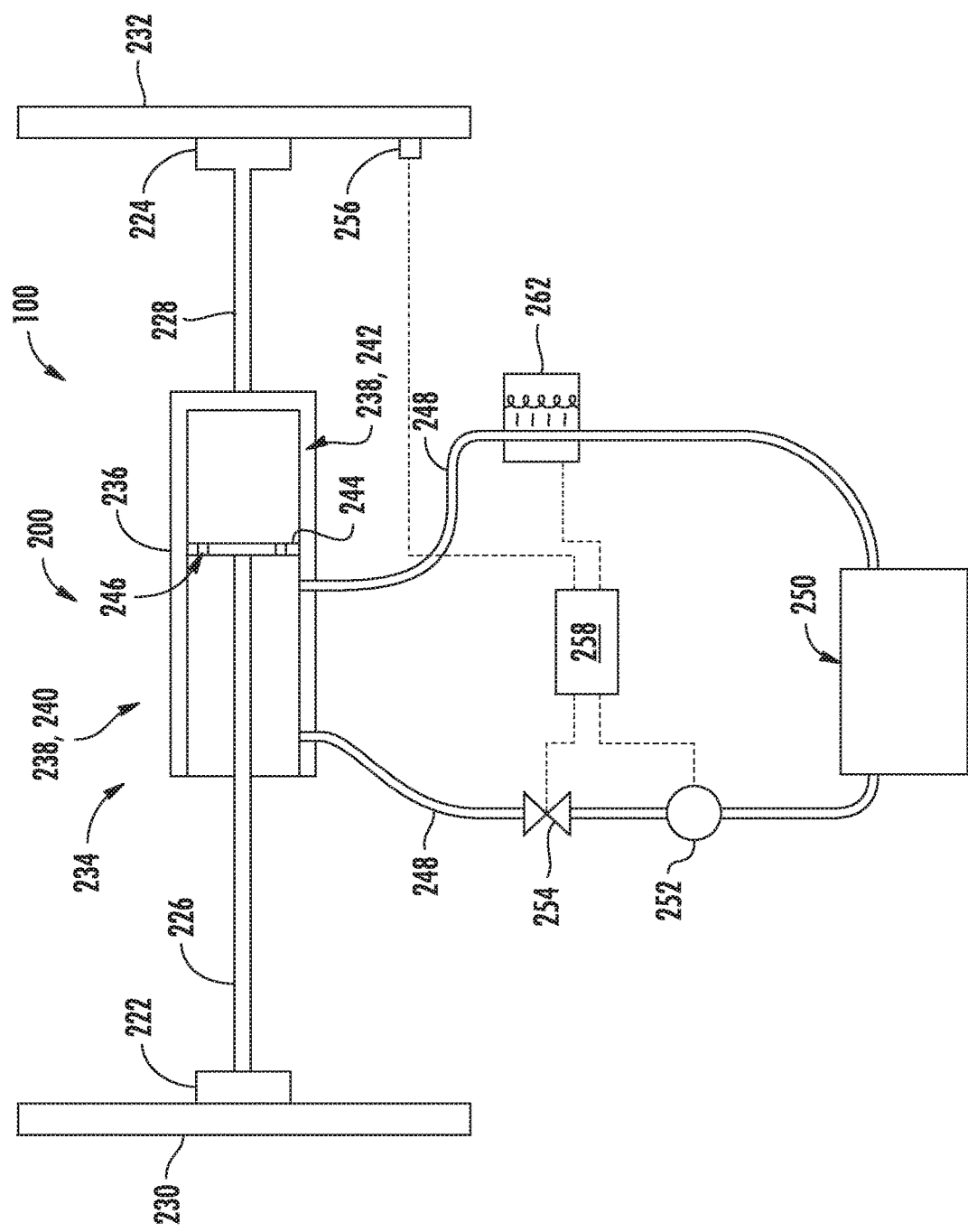
FIG. 17 illustrates a schematic view of one embodiment of a damper configuration suitable for use within the disclosed vibration dampening system in accordance with aspects of the present subject matter.

Referring now to FIG. 17, one embodiment of a suitable configuration for a vibration damper 200 configured for use within the disclosed vibration dampening system 100 is illustrated in accordance with aspects of the present subject matter. Specifically, in several embodiments, the illustrated vibration damper 200 may correspond to a shock absorber or other suitable damping cylinder configured for use as one of the dampers 104, 106 described above with reference to FIGS. 5, 6 and 14-16. As is generally understood, a shock absorber or damping cylinder may generally correspond to a fluid-actuated damping device configured to reduce vibrations. For example, shock absorbers or damping cylinders may absorb shock impulses and convert the kinetic energy of the shock into another form of energy (e.g., heat), such as by converting vibrations or displacements into heat via viscous friction. Additionally, shock absorbers or damping cylinders may be configured as active dampers (e.g., by being configured to be actively controlled) or as passive dampers.

In the embodiment shown in FIG. 17, the damper 200 extends lengthwise between a first end 222 and a second end 224, with the first end 222 configured to be coupled to a first structure 230 (e.g., any of the sidewalls 70, 72 of the chassis frame 21 and/or any of the structural frame members 74, 76 of the cab frame 23) and the second end 224 configured to be coupled to a second structure 232 (e.g., an opposed sidewall 70, 72 of the chassis frame 21 and/or an opposed frame member 74, 76 of the cab frame 23). As shown, the damper includes a shock 234, a first connection member 226 extending from the shock 234 to the first end 222 of the damper 200 coupled to the first structure 230, and a second connection member 228 extending from the shock 234 to the second end 224 of the damper 200 coupled to the second structure 232. In several embodiments, the shock 234 may include an outer casing 236 defining one or more damping cylinders 238. For example, in one embodiment, a first damping cylinder 240 may be separated from a second damping cylinder 242 by a piston 244 configured to slide laterally along the length of the shock 234. It should be appreciated that the piston 244 may be coupled or formed integrally with one of the first connection member 226 or the second connection member 228.

In one embodiment, the piston 244 may be slidable or movable along the length of the shock 234 such that adjusting the position of the piston 244 laterally changes a volume of the first and/or second damping cylinders 240, 242. For example, sliding the piston 244 into the shock 234 may increase the volume of the first damping cylinder 240 while decreasing the volume of the second damping cylinder 242. In this regard, it should be appreciated that vibrations of components of the work vehicle 10, such as the first and second structures 230, 232, may cause displacement of piston 244.

Additionally, the damping cylinder(s) 238 may contain a damping fluid, such as air or oil. For instance, in one embodiment, the first damping cylinder 240 may contain oil, while the second damping cylinder 242 may contain a pressurized gas. As such, displacing the piston 244 may change the volume of the damping cylinders 238 and subject the piston 244 to a damping force acting against the displacement of the piston 244. For example, the displacement of the piston 244 may create a pressure differential between the first damping cylinder 240 and the second damping cylinder 242 opposed to the displacement of the piston 244. Further, the energy of the displacement (such as a vibration on the work vehicle 10) may be converted to heat inside the damping fluid(s). In certain embodiments, the shock 234 may include one or more passageways 246 allowing the damping fluid to pass between adjacent damping cylinders 238.

It should be appreciated that, in other embodiments, the damper 200 may have any other suitable shock or damping configuration that allows it to reduce vibrations acting on the work vehicle 10. For example, the damper 200 may include any number of damping cylinders 238, pistons 244, and/or passageways 246 capable of reducing the vibrations acting on the work vehicle 10.

Additionally, in one embodiment, the damper 200 may be configured to be actively controlled to allow the damper 200 to have an adjustable damping ratio. For example, as shown in FIG. 17, when the illustrated damper 200 is incorporated into one or more embodiments of the disclosed vibration damping system 100, the system 100 may include one or more fluid lines 248 fluidly coupling at least one of the damping cylinders 238 to a fluid tank 250. As such, the amount of the damping fluid contained in the damping cylinder(s) 238 may be adjusted by transferring the damping fluid between the damping cylinder(s) 238 and the fluid tank 250. For example, a pump 252 may be used to pressurize the fluid line 248 to transfer the damping fluid between the tank 250 and the fluid chamber(s) 238. Further, a valve 254 may be fluidly coupled to the fluid line 248 for selectively allowing passage of the damping fluid. In certain situations, increasing the amount of damping fluid in the fluid chamber(s) 238 may increase the damping ratio and produce a more "stiff" damper 200. Similarly, reducing the amount of damping fluid in the fluid chamber(s) 238 may reduce the damping ratio and produce a more "soft" damper 200.

Additionally, to allow for active adjustments to the damping ratio, the system 100 may also include a controller 258. In such an embodiment, the controller 258 may generally correspond to any suitable processor-based device or combination of processor-based devices. Thus, the controller 258 may, for example, include one or more processor(s) and associated memory device(s) configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and/or other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) may generally be configured to store suitable computer-readable instructions that, when implemented by the processor(s), configure the controller 158 to perform various functions.

As indicated by the dashed lines in FIG. 17, the controller 258 may be communicatively coupled to the pump 252 and/or the valve 254 for controlling the operation of such components. For example, in the illustrated embodiment, the controller 258 may communicate a signal to the valve 254 to allow the damping fluid to flow between the tank 250 and the damping cylinder(s) 238, such as by transmitting a suitable control signal(s) to open, close, or partially close/open the valve 248. Further, the controller 258 may also communicate a control signal(s) to the pump 254 to create a pressure differential in the fluid line 248 and, thus, a flow of the damping fluid through the fluid line 248.

Moreover, in one embodiment, the controller 258 may be communicatively coupled to one or more vibration sensors 256 configured to sense any vibrations being transmitted through the components of the work vehicle 10, such as the first and second structures 230, 232. For example, the vibration sensor(s) 256 may be an accelerometer attached to at least one of the first structure 230 or the second structure 232 that senses the vibration of the work vehicle 10. Based on the feedback provided by the vibrations sensor(s) 256, the controller 258 may estimate, for example, a vibration parameter associated with the vibrational energy being transmitted through the work vehicle 10, such as the vibrational displacement of the associated component(s), a derivative of the vibrational displacement, and/or an integral of the vibrational displacement. In such an embodiment, the controller 258 may utilize the estimated vibration parameter to determine a damping ratio adjustment for the damper 200. The determined adjustment may then be used to actively control the operation of the valve 254 and/or the pump 252 in a manner that reduces the vibrations being transmitted through the adjacent components of the work vehicle 10.

Another embodiment of an actively controlled damper 200 is illustrated in FIG. 19 in accordance with aspects of the present disclosure. As shown, the damper 200 includes an actuator 260 fixedly coupled to one of the first connection member 226 or the second connection member 228 and configured to extend/retract the other of the first connection member 226 or the second connection member 228. In such an embodiment, by extending/retracting one of the connection members 226, 228, the actuator 260 may adjust the amount of force being applied to the first structure 230 and/or the second structure 232 by the damper 200, which may be used to dampen the vibrations acting on the first and/or second structures 230, 232. It should be appreciated that the actuator 260 may correspond to any suitable actuation device configured to be electronically controlled, such as fluid-driven actuator, a solenoid-driven actuator, and/or a mechanically-driven actuator.

Similar to the embodiment described above with reference to FIG. 17, the system 100 may include a controller 258 communicatively coupled to the actuator 260. In such an embodiment, the controller 258 may be configured to actively monitor the vibrations being transmitted through the first and/or second structures 230, 232 (e.g., via one or more vibration sensors 256) and actively control the operation of the actuator 260 to reduce the vibrational energy. For example, the controller 258 may receive signals communicated from the sensor 256 including data indicative of the vibration of the work vehicle 10, such as the vibration of the chassis frame 21 and/or the cab frame 23. In response to receipt of such sensor data, the controller 258 may communicate a control signal(s) to the actuator 260 to apply a counter-vibrational force to at least one of the first structure 230 or the second structure 232. For example, the signal may cause the actuator 260 to extend/retract the associated connection member(s) 226, 228 to provide the counter-vibrational force.

In certain embodiments, the controller 258 may communicate a control signal(s) to apply the counter-vibrational force at a phase shift of about 180 degrees from the vibration acting on the work vehicle 10. Vibrating at least one of the chassis frame 21 and/or the cab frame 23 with the phase shift and at approximately the same frequency and amplitude as the vibration acting on such component(s) may cause destructive interference between the vibration and the counter-vibrational force. In certain embodiments, the destructive interference may reduce and/or eliminate the vibration transferred to the cab 18 and, thus, the noise heard and the vibrations felt by the operator.

Referring back to FIG. 17, in one embodiment, the disclosed vibration dampening system 100 may also include a heat transfer member 262 configured to dissipate heat from the damper(s) 200. Specifically, in the embodiment of FIG. 17, the heat transfer member 262 may be configured to dissipate heat from the damping fluid of the damper(s) 200. As described above, the damper(s) 200 may generally reduce vibrations by converting the kinetic energy of the vibration to heat. This heat may be absorbed by the damper(s) 200 and, in some embodiments, the damping fluid.

As shown in FIG. 17, the heat transfer member 262 is provided in fluid communication with the fluid line 248. As such, the damping fluid may be directed through the heat transfer member 262 as it passes between the damper 200 and the tank 250. In certain situations, the damping fluid may absorb heat from the damper 200 and then subsequently transfer the heat energy to the heat transfer member 262 as the damping fluid passes therethrough. In some embodiments, the heat transfer member 262 may be a heat exchanger (e.g., a radiator) configured to absorb heat from the damping fluid. In other embodiments, the heat transfer member 262 may be any other suitable component, combination of components, or system capable of absorbing heat from the damping fluid, such as an intercooler. Additionally, as shown in FIG. 17, the heat transfer member 262 may, in one embodiment, be communicatively coupled to the controller 258 such that the controller 258 may actively control the operation of the heat transfer member 262, such as by transmitting control signals to selectively activate or deactivate the heat transfer member 262.

Referring now to FIG. 18, another embodiment of a means for transferring heat from or otherwise cooling the damper(s) 200 described above with reference to FIG. 17 is illustrated in accordance with aspects of the present subject matter. As shown, the damper 200 includes a plurality of heat transfer members or fins 264 extending outwardly from its outer housing or casing 236. In such an embodiment, the fins 264 may allow heat to be dissipated from the damper 200 via convection to the ambient air surrounding the damper 200. For example, the fins 264 may generally increase the surface area of the outer surface of housing 236. As such, the greater surface area may allow for increased dissipation of heat from the damper 200 to the surrounding ambient air.

Additionally, in one embodiment, the system 100 may also include a fan 266 configured to accelerate air through or otherwise provide an airflow directed towards the fins 264 of the damper 200. As such, the fan 266 may increase the rate at which heat is dissipated from the damper 200. As shown in the illustrated embodiment, the fan 266 may include a plurality of fan blades 268 and a motor 270 drivingly coupled to the fan blades 268. Further, the fan 266 may include a duct 272 surrounding the fan blades 268. The duct 272 may direct the flow of accelerated air towards the damper 200 and, more specifically, towards the fins 264 to allow heat to be dissipated therefrom. Additionally, it should be appreciated that the operation of the fan 266 may be configured to be electronically controlled via an associated controller 258. For example, the controller 258 may be used to actively control the operation of the motor 270 based on, for example, sensor feedback from a temperature sensor detecting the temperature of the damper 200 and/or the damping fluid contained within the damper 200.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A vibration dampening system for a work vehicle, the system comprising:
   a chassis frame extending lengthwise between a front end and a rear end and defining opposed first and second sides, the chassis frame including a first sidewall extending lengthwise along the first side between the front and rear ends of the chassis frame, the chassis frame further including a second sidewall extending lengthwise along the second side between the front and rear ends of the chassis frame;

a cab frame supported relative to the chassis frame via a suspension assembly; and a vibration damper coupled between the opposed first and second sides of the chassis frame, the vibration damper extending lengthwise between a first end coupled to the first sidewall and a second end coupled to the second sidewall, the vibration damper configured to reduce an amount of vibrations being transmitted through the chassis frame to the cab frame via the suspension assembly.

2. The system of claim 1, wherein the vibration damper comprises a fluid-actuated damper.

3. The system of claim 2, wherein the fluid-actuated damper includes at least one damping cylinder containing a damping fluid.

4. The system of claim 2, wherein the fluid-actuated damper is configured as a passive shock absorber.

5. The system of claim 1, further comprising a controller configured to actively adjust a parameter associated with the vibration damper to reduce the amount of vibrations being transmitted through the chassis frame.

6. The system of claim 5, wherein the controller is configured to adjust a damping ratio of the vibration damper.

7. The system of claim 5, wherein the vibration damper comprises an electronically controlled actuator, the controller being configured to control the operation of the actuator to apply a counter-vibrational force to at least one of the first sidewall or the second sidewall.

8. The system of claim 5, further comprising a vibration sensor communicatively coupled to the controller, the controller being configured to monitor the vibrations being transmitted through the chassis frame based on data received from the vibration sensor.

9. The system of claim 1, further comprising at least one heat transfer member configured to dissipate heat from the vibration damper.

10. The system of claim 9, wherein the at least one heat transfer member is configured to dissipate heat from a damping fluid of the vibration damper.

11. The system of claim 10, wherein the at least one heat transfer member comprises a heat exchanger in fluid communication with a fluid line through which the damping fluid is directed.

12. The system of claim 9, wherein the at least one heat transfer member comprises a plurality of fins positioned along an exterior of the vibration damper, the fins being configured to dissipate heat from the vibration damper via convection.

13. The system of claim 12, further comprising a fan configured to direct an airflow across the exterior of the vibration damper.

14. The system of claim 1, wherein the chassis frame extends in a heightwise direction between a top end and a bottom end, the vibration damper being coupled between the first and second sidewalls at a location at or adjacent to the top end of the chassis frame.

15. A work vehicle, comprising:

an operator's cab including a cab frame;

a chassis including a chassis frame, the chassis frame extending lengthwise between a front end and a rear end and defining opposed first and second sides, the chassis frame including a first sidewall extending lengthwise along the first side between the front and rear ends of the chassis frame, the chassis frame further including a second sidewall extending lengthwise along the second side between the front and rear ends of the chassis frame;

a suspension assembly configured to support the cab frame relative to the chassis frame; and a vibration damper coupled between the opposed first and second sides of the chassis frame, the vibration damper extending lengthwise between a first end coupled to the first sidewall and a second end coupled to the second sidewall, the vibration damper configured to reduce an amount of vibrations being transmitted through the chassis frame to the cab frame via the suspension assembly.

16. The work vehicle of claim 15, wherein the vibration damper comprises a fluid-actuated damper.

17. The work vehicle of claim 15, further comprising a controller configured to actively adjust a parameter associated with the vibration damper to reduce the amount of vibrations being transmitted through the chassis frame.

18. The work vehicle claim 17, wherein the controller is configured to adjust a damping ratio of the vibration damper.

19. The work vehicle claim 17, wherein the vibration damper comprises an electronically controlled actuator, the controller being configured to control the operation of the actuator to apply a counter-vibrational force to at least one of the first sidewall or the second sidewall.

20. The work vehicle of claim 15, further comprising at least one heat transfer member provided in association with the vibration damper, the at least one heat transfer member being configured to dissipate heat from the vibration damper.

* * * * *